United States Patent
Nishimura

(10) Patent No.: US 12,535,239 B2
(45) Date of Patent: Jan. 27, 2026

(54) MACHINE LEARNING DEVICE, DEMAND CONTROL SYSTEM AND AIR-CONDITIONER CONTROL SYSTEM

(71) Applicant: DAIKIN INDUSTRIES, LTD., Osaka (JP)

(72) Inventor: Tadafumi Nishimura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 673 days.

(21) Appl. No.: 17/824,677

(22) Filed: May 25, 2022

(65) Prior Publication Data

US 2022/0282884 A1 Sep. 8, 2022

Related U.S. Application Data

(63) Continuation of application No. PCT/JP2020/044113, filed on Nov. 26, 2020.

(30) Foreign Application Priority Data

Nov. 26, 2019 (JP) ................................ 2019-213365

(51) Int. Cl.
 *F24F 11/63* (2018.01)
 *F24F 11/47* (2018.01)
 (Continued)

(52) U.S. Cl.
 CPC .............. *F24F 11/63* (2018.01); *F24F 11/47* (2018.01); *F24F 2110/10* (2018.01); *F24F 2110/20* (2018.01)

(58) Field of Classification Search
 CPC .................................................... F24F 11/47
 See application file for complete search history.

(56) References Cited

U.S. PATENT DOCUMENTS

2011/0035075 A1 2/2011 Tomita et al.
2016/0305678 A1 10/2016 Pavlovski et al.
(Continued)

FOREIGN PATENT DOCUMENTS

| JP | 5-93539 A | 4/1993 |
|---|---|---|
| JP | 2704026 B2 | 1/1998 |

(Continued)

OTHER PUBLICATIONS

International Search Report of corresponding PCT Application No. PCT/JP2020/044113 dated Mar. 2, 2021.
(Continued)

*Primary Examiner* — Nathan L Laughlin
(74) *Attorney, Agent, or Firm* — GLOBAL IP COUNSELORS, LLP

(57) ABSTRACT

A machine learning device learns a set temperature, in a target space, in order to achieve a demand target value that is an upper-limit value of a power consumption of an air conditioner, installed in the target space, in a predetermined period. The machine learning device includes a learning unit, first and second acquisition units, and an updating unit. The first acquisition unit acquires a first variable including at least one of the power consumption of the air conditioner and an indoor state value correlated with a state in the target space. The second acquisition unit acquires evaluation data useable to evaluate a control result of the air conditioner. The updating unit updates, by using the evaluation data, a learning state of the learning unit. The learning unit performs learning in accordance with an output of the updating unit. The evaluation data includes the power consumption of the air conditioner.

8 Claims, 16 Drawing Sheets

(51) Int. Cl.
  *F24F 110/10* (2018.01)
  *F24F 110/20* (2018.01)

(56) References Cited

U.S. PATENT DOCUMENTS

| | | | |
|---|---|---|---|
| 2017/0227950 A1* | 8/2017 | Kinoshita | G06Q 10/063118 |
| 2018/0195752 A1 | 7/2018 | Sasaki et al. | |
| 2018/0323643 A1* | 11/2018 | Arar | H02J 3/14 |
| 2019/0271483 A1 | 9/2019 | Joo et al. | |
| 2021/0405727 A1* | 12/2021 | Singh | G06F 1/329 |
| 2022/0154960 A1* | 5/2022 | Hokari | F24F 11/64 |
| 2022/0205661 A1* | 6/2022 | Fujita | G05D 23/1917 |

FOREIGN PATENT DOCUMENTS

| | | |
|---|---|---|
| JP | 2011-36084 A | 2/2011 |
| JP | 2017-67427 A | 4/2017 |
| JP | 2019-60514 A | 4/2019 |
| KR | 101754536 B1 | 7/2017 |
| WO | 2018/199167 A1 | 11/2018 |

OTHER PUBLICATIONS

European Search Report of corresponding EP Application No. 20 89 2024.9 dated Mar. 31, 2023.
Naug Aviek et al.; "Online Energy Management in Commercial Buildings using Deep Reinforcement Learning", 2019 IEEE International Conference on Smart Computing, IEEE, Jun. 12, 2019, pp. 249-257, XP033588066.
Arash Kamari et al.; "Prediction of Air Specific Heat Ratios at Elevated Pressures using a Novel Modeling Approach", Chemical Engineering & Technology, J. Wiley, Hoboken, USA, vol. 37, No. 12, Nov. 13, 2014, pp. 2045-2055, XP071792189.
International Preliminary Report of corresponding PCT Application No. PCT/JP2020/044113 dated Jun. 9, 2022.

* cited by examiner

MACHINE LEARNING DEVICE, DEMAND CONTROL SYSTEM AND AIR-CONDITIONER CONTROL SYSTEM

CROSS-REFERENCE TO RELATED APPLICATIONS

This is a continuation of International Application No. PCT/JP2020/044113 filed on Nov. 26, 2020, which claims priority to Japanese Patent Application No. 2019-213365, filed on Nov. 26, 2019. The entire disclosures of these applications are incorporated by reference herein.

BACKGROUND

Technical Field

The present disclosure relates a machine learning device, a demand control system including the machine learning device, and an air-conditioner control system including the machine learning device.

Background Art

Japanese Unexamined Patent Application Publication No. 2011-36084 discloses a configuration that creates partial load characteristics of an air conditioner and indoor heat capacity characteristics from data of a past operation record of the air conditioner and determines a set temperature for implementing a predetermined power target value of the air conditioner.

SUMMARY

A machine learning device according to a first aspect learns a set temperature, in a target space, in order to achieve a demand target value that is an upper-limit value of a power consumption of an air conditioner, installed in the target space, in a predetermined period. The machine learning device includes a learning unit, a first acquisition unit, a second acquisition unit, and an updating unit. The first acquisition unit is configured to acquire a first variable including at least one of the power consumption of the air conditioner and an indoor state value correlated with a state in the target space. The second acquisition unit is configured to acquire evaluation data useable to evaluate a control result of the air conditioner. The updating unit is configured to update, by using the evaluation data, a learning state of the learning unit. The learning unit is configured to perform learning in accordance with an output of the updating unit. The evaluation data includes the power consumption of the air conditioner.

DETAILED DESCRIPTION OF EMBODIMENT(S)

First Embodiment

A demand control system 10 according to a first embodiment will be described with reference to the drawings. The demand control system 10 controls an air conditioner 110 to achieve a demand target value. The demand target value is an upper-limit value of a power consumption of the air conditioner 110, installed in a target space, in a predetermined period. That is, the demand control system 10 controls the air conditioner 110 such that an actual power consumption of the air conditioner 110 does not exceed the demand target value.

The demand control system 10 includes a machine learning device 100 and the air conditioner 110. By using a machine learning technique, the machine learning device 100 learns a set temperature, in the target space, for achieving a predetermined demand target value. The demand control system 10 acquires the set temperature in the target space on the basis of a result of learning performed by the machine learning device 100, and controls the air conditioner 110 on the basis of the set temperature. The machine learning device 100 is constituted by one or a plurality of computers. In the case where the machine learning device 100 is constituted by a plurality of computers, the plurality of computers may be connected to each other via a network.

Figure 1:
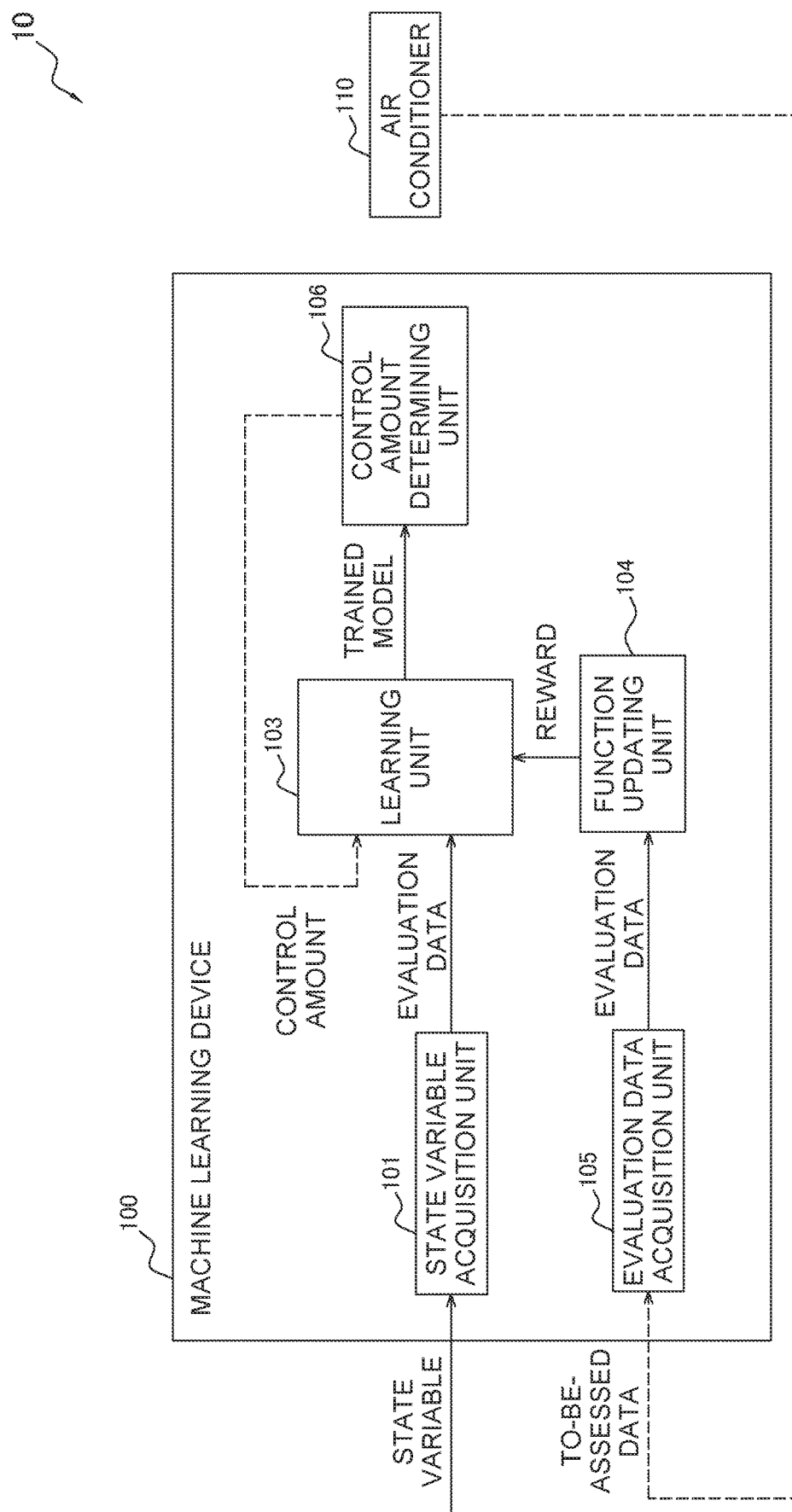
FIG. 1 is a block diagram of a machine learning device 100 during learning in accordance with a first embodiment.
Figure 2:
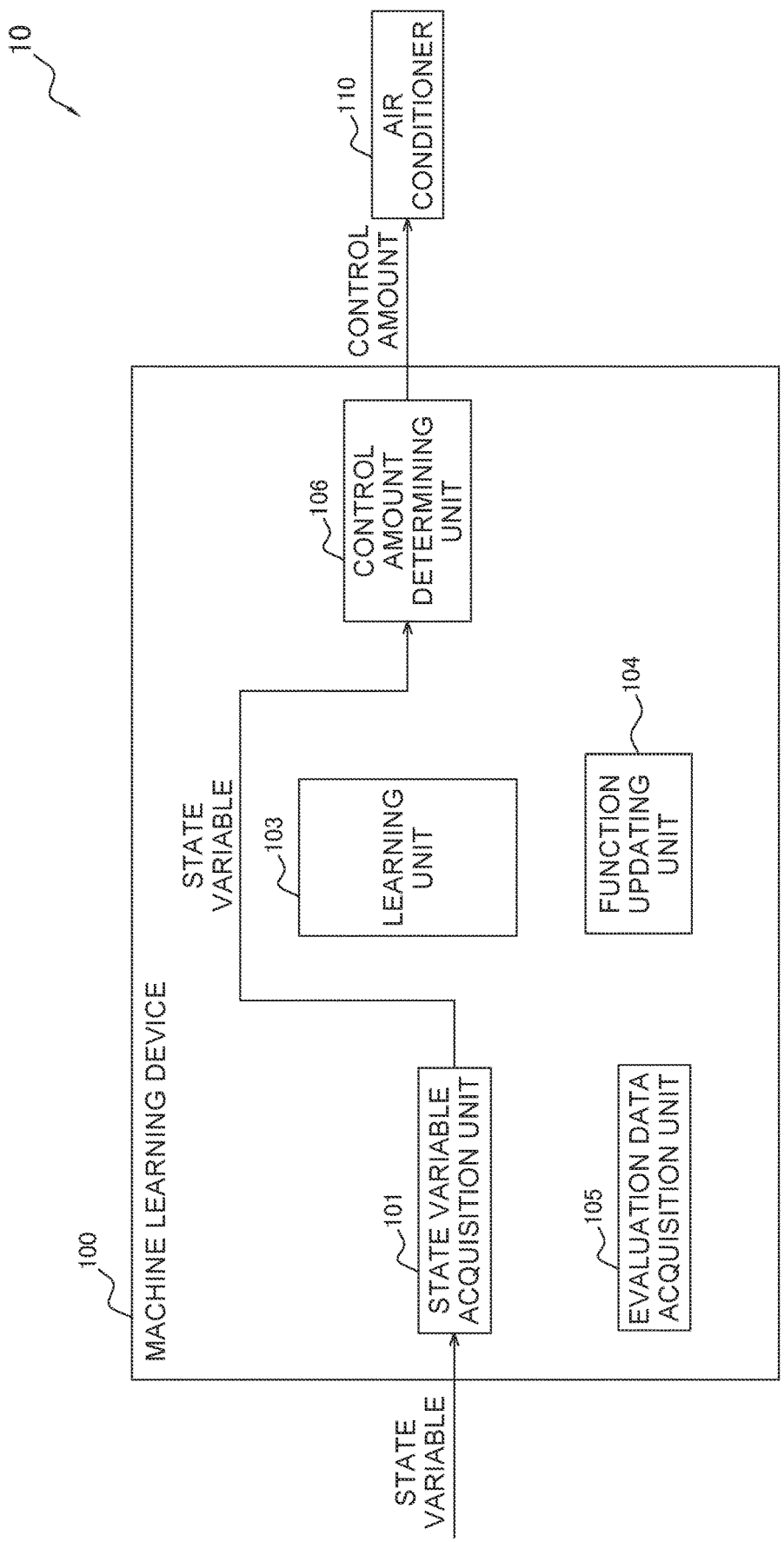
FIG. 2 is a block diagram of the machine learning device 100 after learning in accordance with the first embodiment.

FIG. 1 is a block diagram of the machine learning device 100 during learning in the first embodiment. FIG. 2 is a block diagram of the machine learning device 100 after learning in the first embodiment. The machine learning device 100 mainly includes a state variable acquisition unit 101, a learning unit 103, a function updating unit 104, an evaluation data acquisition unit 105, and a control amount determining unit 106. The state variable acquisition unit 101 to the control amount determining unit 106 are implemented as a result of a CPU of the machine learning device 100 executing a program stored in a storage device of the machine learning device 100.

The state variable acquisition unit 101 acquires a state variable (first variable). The state variable includes at least one of the power consumption of the air conditioner 110 and an indoor state value correlated with a state in the target space. The indoor state value is at least one of a temperature, a humidity, an amount of change in temperature, and an amount of change in humidity in the target space.

The evaluation data acquisition unit 105 acquires evaluation data for evaluating a control result of the air conditioner 110. The evaluation data includes at least the power consumption of the air conditioner 110.

The function updating unit 104 updates a learning state of the learning unit 103 by using the evaluation data acquired by the evaluation data acquisition unit 105.

As illustrated in FIG. 1, the learning unit 103 learns the state variable acquired by the state variable acquisition unit 101 and the control amount (set temperature in the target space) in association with each other. The learning unit 103 outputs a trained model which is a learning result.

The learning unit 103 performs learning in accordance with an output of the function updating unit 104. In the first embodiment, the learning unit 103 performs reinforcement learning in which learning is performed by using a reward. The function updating unit 104 calculates the reward on the basis of the evaluation data acquired by the evaluation data acquisition unit 105. Specifically, the function updating unit 104 calculates a higher reward as a difference between the predetermined demand target value and the actual power consumption of the air conditioner 110 included in the evaluation data is smaller.

As illustrated in FIG. 2, on the basis of the trained model obtained as a result of learning performed by the learning unit 103, the control amount determining unit 106 determines the control amount (set temperature in the target space) from the state variable acquired by the state variable acquisition unit 101. The control amount determined by the control amount determining unit 106 is used in learning performed by the learning unit 103.

On the basis of the set temperature determined by the control amount determining unit 106, the air conditioner 110 controls air-conditioning performed by the air conditioner 110. The air conditioner 110 adjusts parameters to be controlled by the air conditioner 110 to perform control for achieving the set temperature determined by the control amount determining unit 106. The parameters to be controlled are, for example, the number of revolutions of a compressor of the air conditioner 110 and an opening degree of an electric valve which is an expansion mechanism of the air conditioner 110.

The evaluation data acquisition unit 105 inputs predetermined to-be-assessed data to a predetermined evaluation function, and acquires an output value of the evaluation function as the evaluation data. That is, the evaluation function refers to a mapping from the to-be-assessed data to the evaluation data. The to-be-assessed data is a parameter correlated with the power consumption of the air conditioner 110. The parameter correlated with the power consumption of the air conditioner 110 is, for example, at least one of a power value of the air conditioner 110, a current value of the air conditioner 110, and the number of revolutions of the compressor.

In the case where a predetermined demand target value is set, the machine learning device 100 automatically determines the set temperature, in the target space, for implementing the demand target value. Thus, inclusion of the machine learning device 100 enables the demand control system 10 to calculate the set temperature directly from the demand target value. Thus, the demand control system 10 can improve the energy conservation performance by performing air-conditioning control for achieving the predetermined demand target value.

Second Embodiment

An air-conditioner control system 20 according to a second embodiment will be described with reference to the drawings. The air-conditioner control system 20 controls an air conditioner 210 installed in a target space.

The air-conditioner control system 20 includes a machine learning device 200. The machine learning device 200 learns partial load characteristics of the air conditioner 210 installed in the target space. The machine learning device 200 is constituted by one or a plurality of computers. In the case where the machine learning device 200 is constituted by a plurality of computers, the plurality of computers may be connected to each other via a network.

Figure 3:
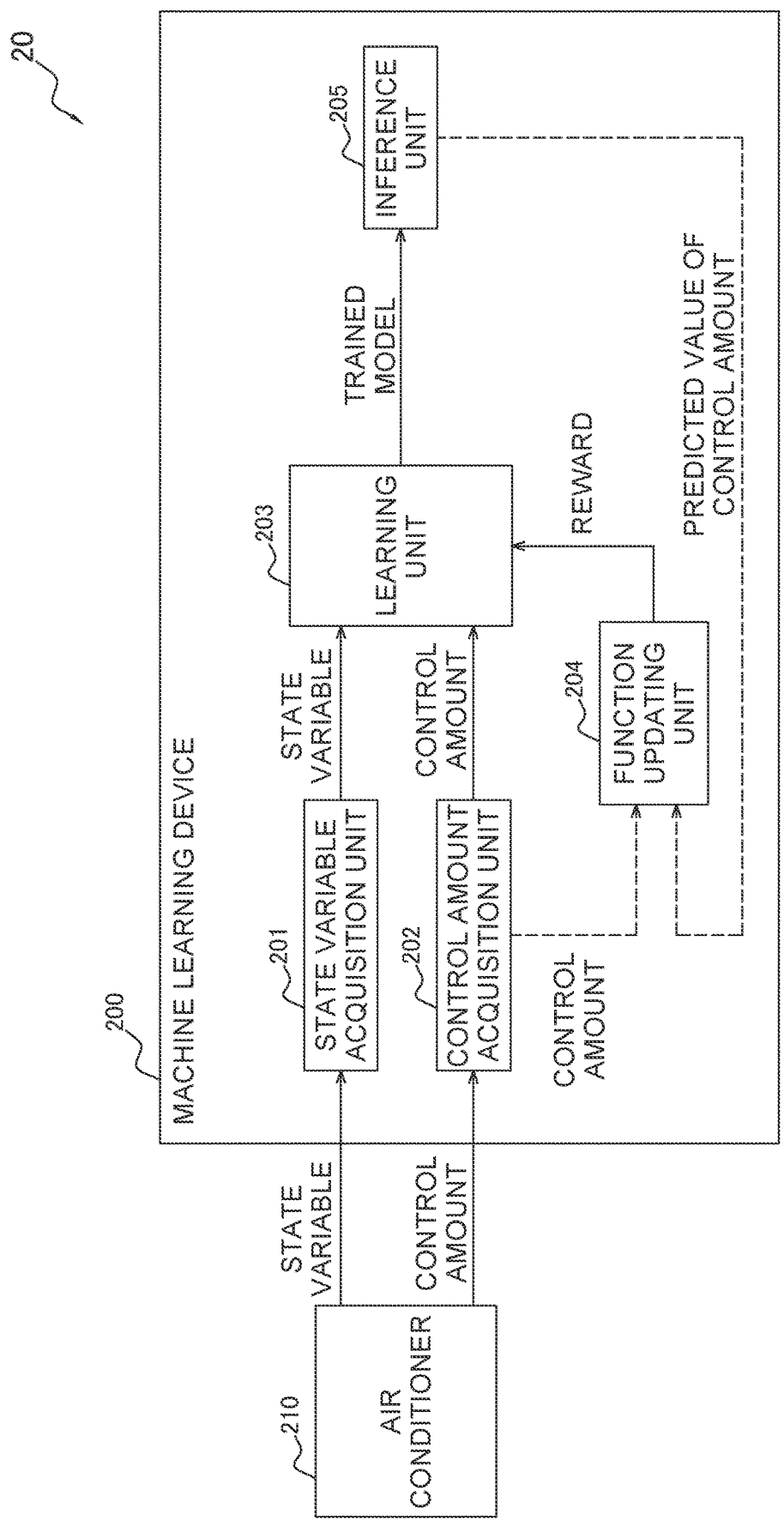
FIG. 3 is a block diagram of a machine learning device 200 during learning in accordance with a second embodiment.
Figure 4:
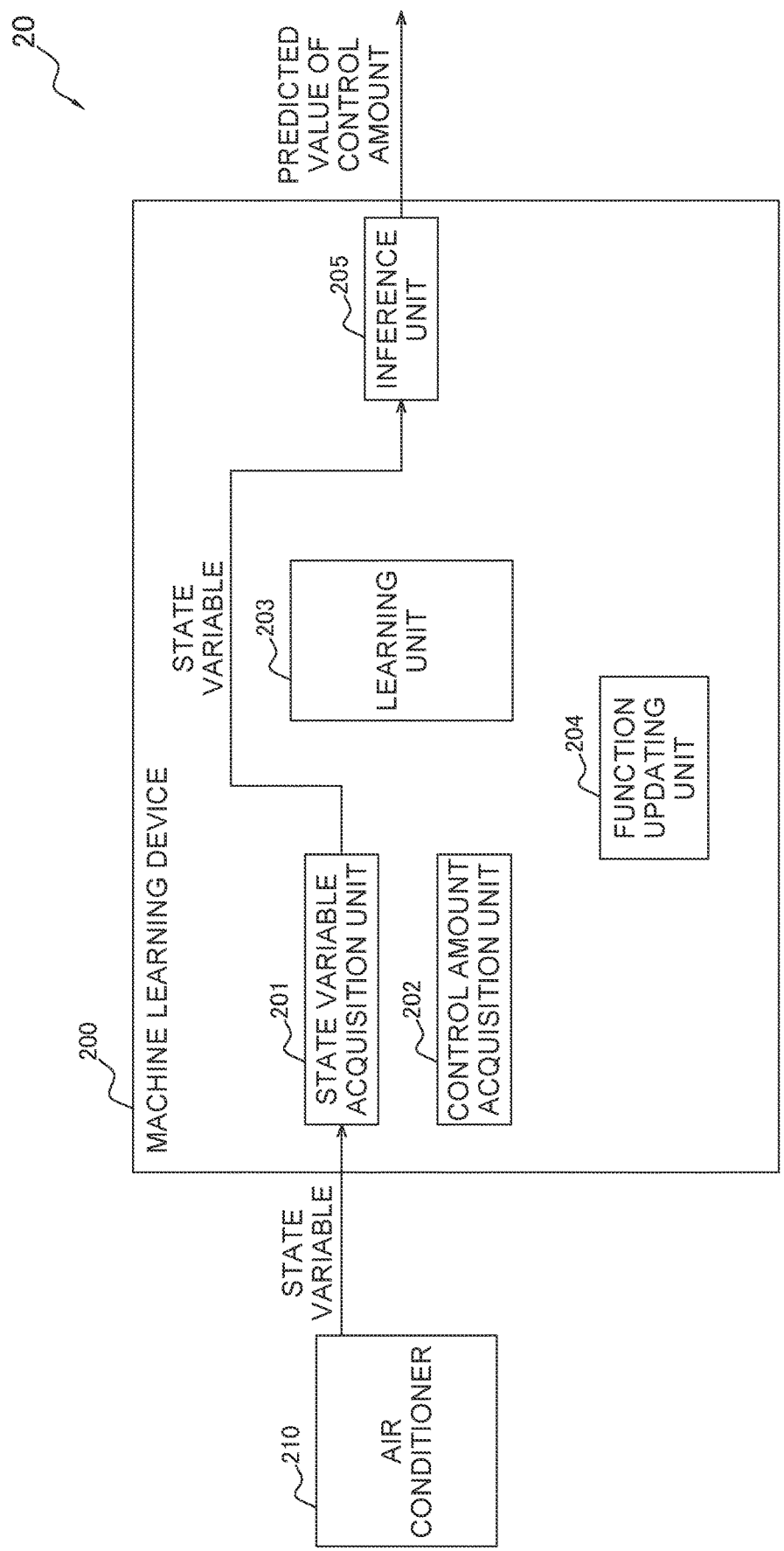
FIG. 4 is a block diagram of the machine learning device 200 after learning in accordance with the second embodiment.

FIG. 3 is a block diagram of the machine learning device 200 during learning in the second embodiment. FIG. 4 is a block diagram of the machine learning device 200 after learning in second embodiment. The machine learning device 200 mainly includes a state variable acquisition unit 201, a control amount acquisition unit 202, a learning unit 203, a function updating unit 204, and an inference unit 205. The state variable acquisition unit 201 to the inference unit 205 are implemented as a result of a CPU of the machine learning device 200 executing a program stored in a storage device of the machine learning device 200.

The state variable acquisition unit 201 acquires a state variable (first variable) including at least a first parameter related to an operation record of the air conditioner 210. The first parameter includes at least one of a parameter correlated with a capacity of the air conditioner 210 and a parameter correlated with the power consumption of the air conditioner 210. The parameter correlated with the capacity of the air conditioner 210 is at least one of the number of revolutions of a compressor, an evaporation temperature of refrigerant, a condensation temperature of the refrigerant, the number of indoor units in operation, an air flow rate of an indoor fan, and an opening degree of an electric valve of the indoor unit. The parameter correlated with the power consumption of the air conditioner 210 is, for example, at least one of a power value of the air conditioner 210, a current value of the air conditioner 210, and the number of revolutions of the compressor. The first parameter may further include an air condition including an indoor temperature, an indoor humidity, an outdoor temperature, and an outdoor humidity during operation.

The control amount acquisition unit 202 acquires a control amount (second variable) including at least partial load characteristics of the air conditioner 210. The partial load characteristics of the air conditioner 210 include a combination of the parameter correlated with the capacity of the air conditioner 210 and the power consumption of the air conditioner 210. The partial load characteristics refer to, for example, data related to a change in power consumption of the air conditioner 210, relative to the parameter correlated with the capacity of the air conditioner 210.

As illustrated in FIG. 3, the learning unit 203 learns the state variable acquired by the state variable acquisition unit 201 and the control amount acquired by the control amount acquisition unit 202 in association with each other. In the second embodiment, the learning unit 203 performs reinforcement learning in which learning is performed by using a reward. The learning unit 203 outputs a trained model which is a learning result.

The function updating unit 204 calculates the reward on the basis of the control amount acquired by the control amount acquisition unit 202 and a predicted value of the control amount. Specifically, the function updating unit 204 calculates a higher reward as the partial load characteristics of the air conditioner 210 included in the control amount are closer to a predicted value of the partial load characteristics of the air conditioner 210. That is, the reward calculated by the function updating unit 204 increases as a difference between the actual value of the partial load characteristics of the air conditioner 210 and the predicted value of the partial load characteristics of the air conditioner 210 decreases.

As illustrated in FIG. 4, the inference unit 205 infers the predicted value of the partial load characteristics of the air conditioner 210 from the state variable acquired by the state variable acquisition unit 201, on the basis of the trained model obtained as a result of learning performed by the learning unit 203. The inference unit 205 outputs the predicted value of the partial load characteristics of the air conditioner 210. The air-conditioner control system 20 controls the air conditioner 210 on the basis of the predicted value output by the inference unit 205.

The machine learning device 200 acquires the predicted value of the partial load characteristics of the air conditioner 210 by using the parameter related to the operation record of the air conditioner 210. Inclusion of the machine learning device 200 enables the air-conditioner control system 20 to acquire the predicted value of the partial load characteristics of the air conditioner 210 with a high accuracy. Thus, the air-conditioner control system 20 can predict the power consumption of the air conditioner 210 during operation on the basis of the predicted value of the partial load characteristics of the air conditioner 210. Therefore, for example, in the case where a predetermined demand target value is set, the air-conditioner control system 20 can automatically determine the control parameter for implementing the demand target value. Thus, the air-conditioner control system 20 can improve the energy conservation performance by improving the prediction accuracy of the power consumption of the air conditioner 210 during the operation and by performing air-conditioning control for achieving the predetermined demand target value.

Third Embodiment

An air-conditioner control system 30 according to a third embodiment will be described with reference to the drawings. The air-conditioner control system 30 controls an air conditioner 310 installed in a target space.

The air-conditioner control system 30 includes a machine learning device 300. The machine learning device 300 learns heat capacity characteristics of the target space where the air conditioner 310 is installed. The machine learning device 300 is constituted by one or a plurality of computers. In the case where the machine learning device 300 is constituted by a plurality of computers, the plurality of computers may be connected to each other via a network.

Figure 5:
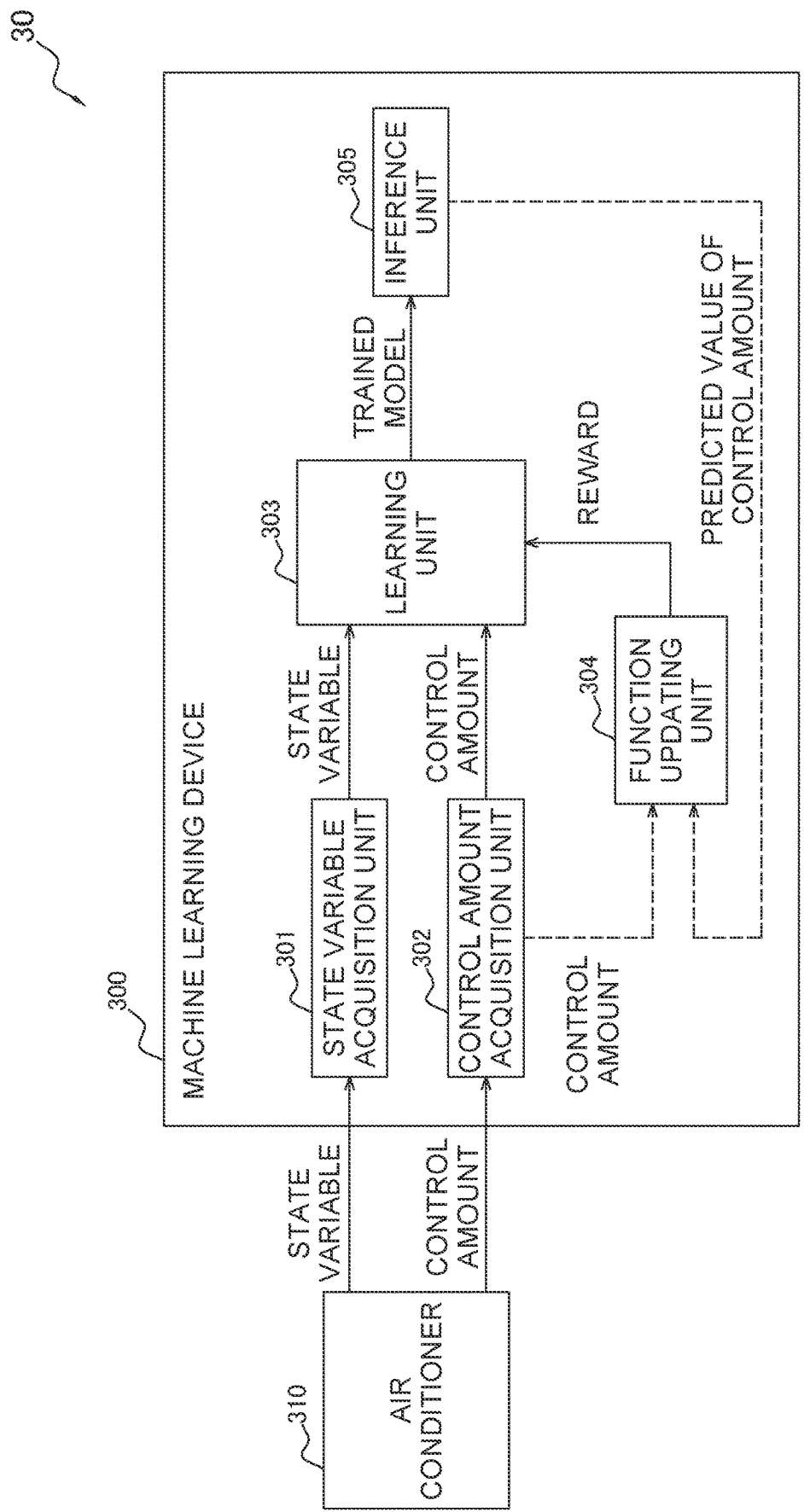
FIG. 5 is a block diagram of a machine learning device 300 during learning in accordance with a third embodiment.
Figure 6:
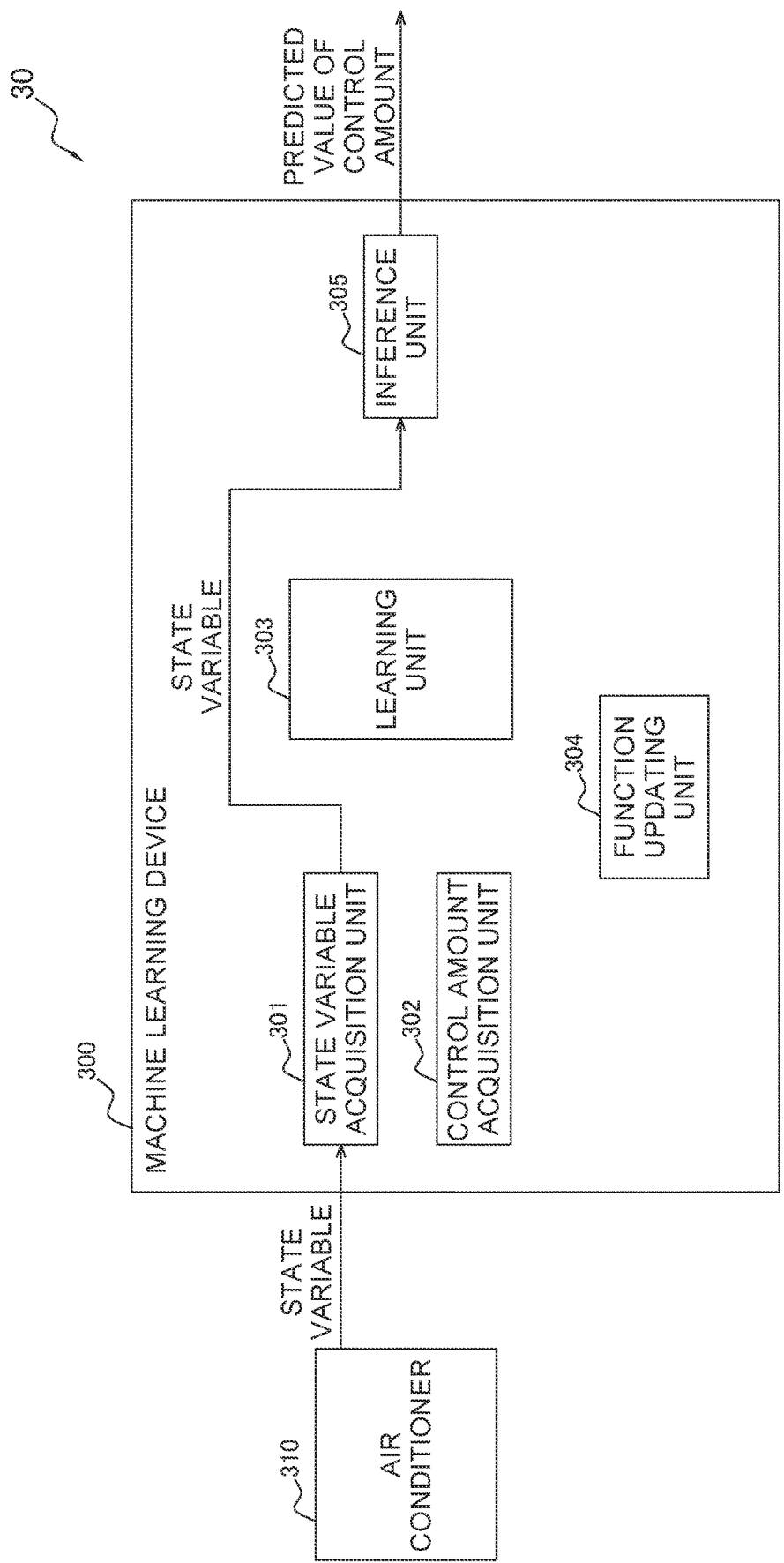
FIG. 6 is a block diagram of the machine learning device 300 after learning in accordance with the third embodiment.

FIG. 5 is a block diagram of the machine learning device 300 during learning in the third embodiment. FIG. 6 is a block diagram of the machine learning device 300 after learning in the third embodiment. The machine learning device 300 mainly includes a state variable acquisition unit 301, a control amount acquisition unit 302, a learning unit 303, a function updating unit 304, and an inference unit 305.

The state variable acquisition unit 301 to the inference unit 305 are implemented as a result of a CPU of the machine learning device 300 executing a program stored in a storage device of the machine learning device 300.

The state variable acquisition unit 301 acquires a state variable (first variable) including at least one of a first parameter and a second parameter. The first parameter is a parameter correlated with a capacity of the air conditioner 310. The second parameter is a parameter correlated with a state in the target space where the air conditioner 310 is installed. The parameter correlated with the capacity of the air conditioner 310 is at least one of the number of revolutions of a compressor, an evaporation temperature of refrigerant, a condensation temperature of the refrigerant, the number of indoor units in operation, an air flow rate of an indoor fan, and an opening degree of an electric valve of the indoor unit. The parameter correlated with the state in the target space is at least one of a temperature, a humidity, an amount of change in temperature, and an amount of change in humidity in the target space.

The control amount acquisition unit 302 acquires a control amount (second variable) including at least heat capacity characteristics of the target space. The heat capacity characteristics of the target space include a combination of the first parameter and the second parameter. The heat capacity characteristics refer to, for example, data related to a change in the second parameter relative to the first parameter.

As illustrated in FIG. 5, the learning unit 303 learns the state variable acquired by the state variable acquisition unit 301 and the control amount acquired by the control amount acquisition unit 302 in association with each other. In the third embodiment, the learning unit 303 performs reinforcement learning in which learning is performed by using a reward. The learning unit 303 outputs a trained model which is a learning result.

The function updating unit 304 calculates the reward on the basis of the control amount acquired by the control amount acquisition unit 302 and a predicted value of the control amount. Specifically, the function updating unit 304 calculates a higher reward as the heat capacity characteristics of the target space included in the control amount at each set temperature are closer to a predicted value of the heat capacity characteristics of the target space. That is, the reward calculated by the function updating unit 304 increases as a difference between the actual value of the heat capacity characteristics of the target space at each set temperature and the predicted value of the heat capacity characteristics of the target space decreases.

As illustrated in FIG. 6, the inference unit 305 infers the predicted value of the heat capacity characteristics of the target space from the state variable acquired by the state variable acquisition unit 301, on the basis of the trained model obtained as a result of learning performed by the learning unit 303. The inference unit 305 outputs the predicted value of the heat capacity characteristics of the target space. The air-conditioner control system 30 controls the air conditioner 310 on the basis of the predicted value output by the inference unit 305.

The machine learning device 300 acquires the predicted value of the heat capacity characteristics of the target space where the air conditioner 310 is installed, by using at least one of the first parameter and the second parameter. Inclusion of the machine learning device 300 enables the air-conditioner control system 30 to acquire the predicted value of the heat capacity characteristics of the target space with a high accuracy. Thus, the air-conditioner control system 30 can predict, for example, the partial load characteristics of the air conditioner 310 on the basis of the predicted value of the heat capacity characteristics of the target space and can predict the power consumption of the air conditioner 310 during operation. Therefore, for example, in the case where a predetermined demand target value is set, the air-conditioner control system 30 can automatically determine the control parameter for implementing the demand target value. Thus, the air-conditioner control system 30 can improve the energy conservation performance by improving the prediction accuracy of the power consumption of the air conditioner 310 during the operation and by performing air-conditioning control for achieving the predetermined demand target value.

Fourth Embodiment

An air-conditioner control system 40 according to a fourth embodiment will be described with reference to the drawings. The air-conditioner control system 40 controls an air conditioner 410 installed in a target space.

Figure 7:
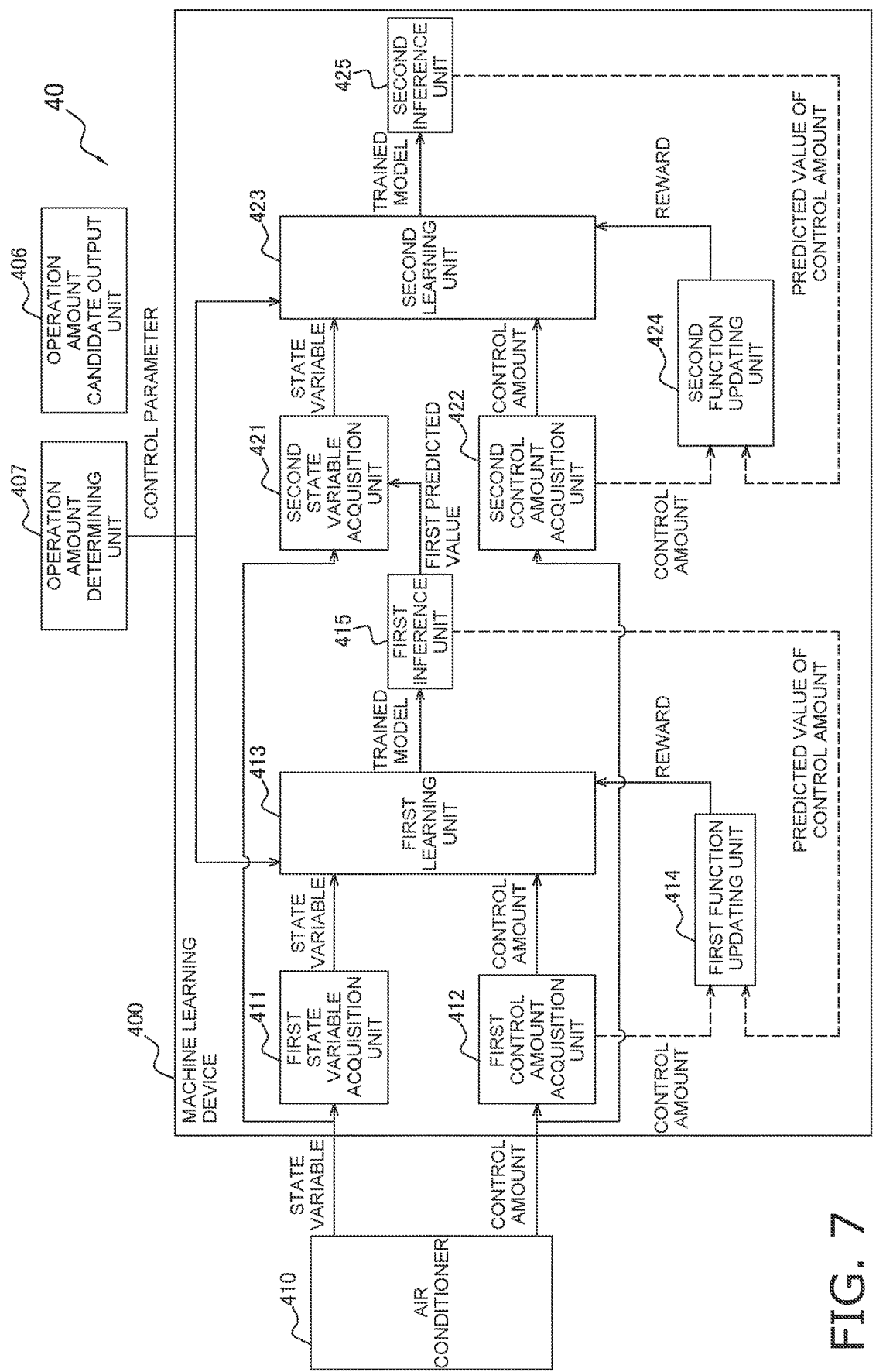
FIG. 7 is a block diagram of a machine learning device 400 during learning in accordance with a fourth embodiment.
Figure 8:
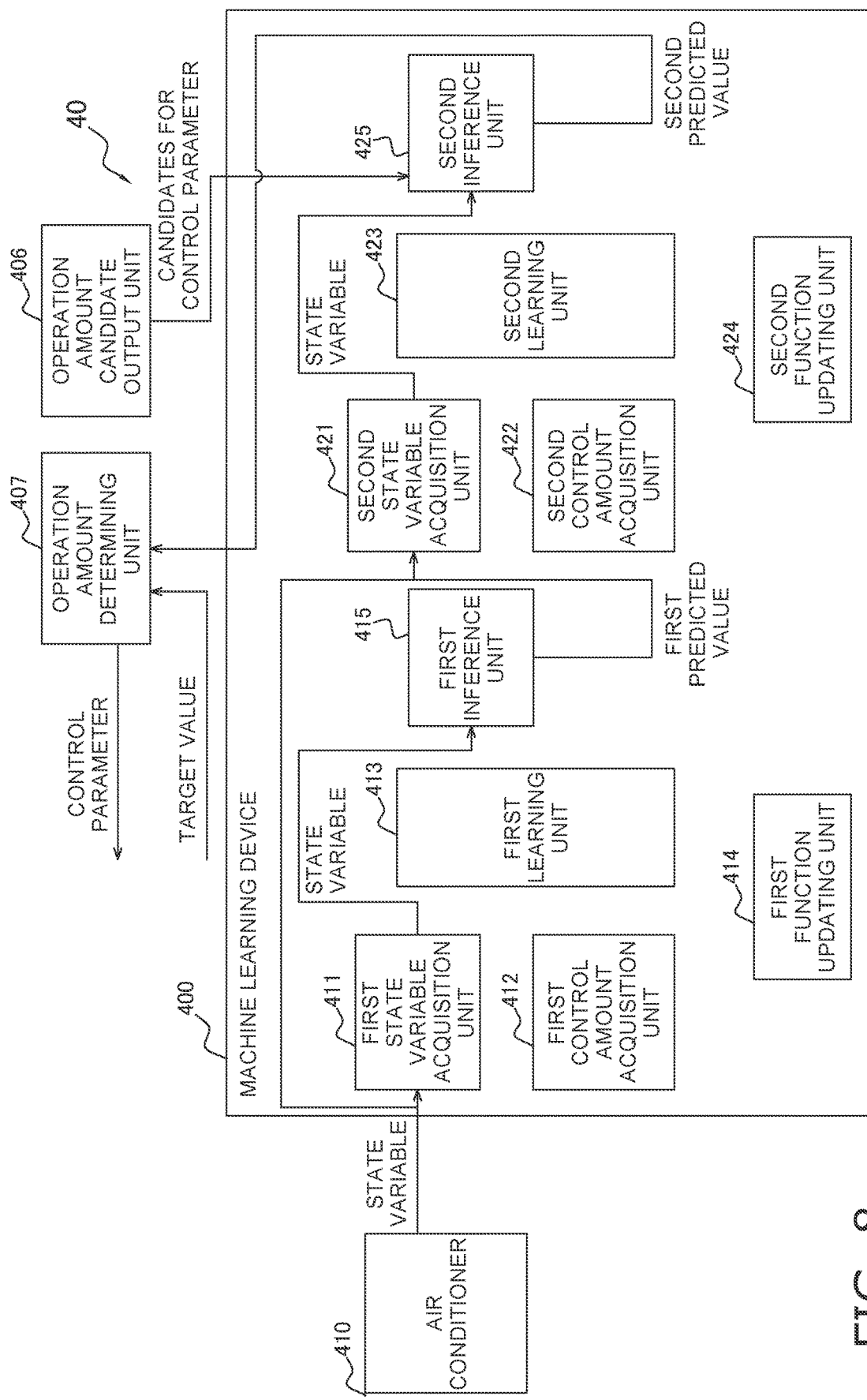
FIG. 8 is a block diagram of the machine learning device 400 after learning in accordance with the fourth embodiment.

The air-conditioner control system 40 includes a machine learning device 400, an operation amount candidate output unit 406, and an operation amount determining unit 407. FIG. 7 is a block diagram of the machine learning device 400 during learning in the fourth embodiment. FIG. 8 is a block diagram of the machine learning device 400 after learning in the fourth embodiment.

The machine learning device 400 learns heat capacity characteristics of the target space where the air conditioner 410 is installed and partial load characteristics of the air conditioner 410 installed in the target space. The machine learning device 400 includes a first state variable acquisition unit 411, a first control amount acquisition unit 412, a first learning unit 413, a first function updating unit 414, a first inference unit 415, a second state variable acquisition unit 421, a second control amount acquisition unit 422, a second learning unit 423, a second function updating unit 424, and a second inference unit 425.

The first state variable acquisition unit 411 acquires a state variable (first variable) including at least one of a first parameter correlated with a capacity of the air conditioner 410 and a second parameter correlated with a state in the target space.

The first control amount acquisition unit 412 acquires a state variable (second variable) including the heat capacity characteristics of the target space.

The first learning unit 413 and the first function updating unit 414 have the same functions as the learning unit 303 and the function updating unit 304 of the third embodiment, respectively.

The first inference unit 415 infers a predicted value (first predicted value) of the heat capacity characteristics of the target space from the state variable (first variable) on the basis of a learning result of the first learning unit 413.

As illustrated in FIG. 8, the second state variable acquisition unit 421 acquires a state variable (third variable) including at least the predicted value (first predicted value) of the heat capacity characteristics of the target space output by the first inference unit 415. The second state variable acquisition unit 421 may further acquire, as the state variable, a parameter (operation record parameter) related to an operation record of the air conditioner 410. The operation record parameter includes at least one of a parameter correlated with a capacity of the air conditioner 410 and a parameter correlated with the power consumption of the air conditioner 410. The parameter correlated with the capacity of the air conditioner 410 is at least one of the number of revolutions of a compressor, an evaporation temperature of refrigerant, a condensation temperature of the refrigerant, the number of indoor units in operation, an air flow rate of an indoor fan, and an opening degree of an electric valve of the indoor unit. The parameter correlated with the power consumption of the air conditioner 410 is, for example, at least one of a power value of the air conditioner 410, a current value of the air conditioner 410, and the number of revolutions of the compressor. The operation record parameter may further include an air condition including an indoor temperature, an indoor humidity, an outdoor temperature, and an outdoor humidity during operation.

The second control amount acquisition unit 422 acquires a control amount (fourth variable) including the partial load characteristics of the air conditioner 410.

The second learning unit 423 and the second function updating unit 424 have the same functions as the learning unit 203 and the function updating unit 204 of the second embodiment, respectively.

The second inference unit 425 infers a predicted value (second predicted value) of the partial load characteristics of the air conditioner 410 from the state variable (third variable) on the basis of candidates for the control parameter output by the operation amount candidate output unit 406 and a learning result of the second learning unit 423. The control parameter is a parameter for use in control of the air conditioner 410. The control parameter includes the set temperature, in the target space, for achieving the demand target value that is an upper-limit value of the power consumption of the air conditioner 410, installed in the target space, in a predetermined period.

The operation amount candidate output unit 406 outputs candidates for the control parameter for use in control of the air conditioner 410. The operation amount candidate output unit 406 outputs the candidates for the control parameter on the basis of the state variables acquired by the first state variable acquisition unit 411 and the second state variable acquisition unit 421, for example.

The operation amount determining unit 407 determines the control parameter for use in control of the air conditioner 410 such that the predicted value of the partial load characteristics of the air conditioner 410 installed in the target space satisfy a predetermined condition. Specifically, the operation amount determining unit 407 determines the control parameter such that a difference between a target value of the partial load characteristics of the air conditioner 410 and the predicted value (second predicted value) of the partial load characteristics inferred by the second inference unit 425 decreases. As illustrated in FIG. 7, the first learning unit 413 and the second learning unit 423 may perform learning by using the control parameter determined by the operation amount determining unit 407, and may output a trained model.

The machine learning device 400 can determine the control parameter suitable for creation of the trained model for acquiring the predicted value of the partial load characteristics of the air conditioner 410 and suitable for inference of the predicted value. Inclusion of the machine learning device 400 enables the air-conditioner control system 40 to acquire the predicted value of the partial load characteristics of the air conditioner 410 with a high accuracy. Thus, the air-conditioner control system 40 can predict the power consumption of the air conditioner 410 during operation on the basis of the predicted value of the partial load characteristics of the air conditioner 410. Therefore, in the case where a predetermined demand target value is set, the air-conditioner control system 40 can automatically determine the control parameter for implementing the demand target value. Thus, the air-conditioner control system 40 can improve the energy conservation performance by improving the prediction accuracy of the power consumption of the air conditioner 410 during the operation and by performing air-conditioning, control for achieving the predetermined demand target value.

Modifications

At least some modifications of the embodiments will be described below.

(1) Modification A

In the first embodiment, the learning unit 103 performs reinforcement learning in which learning is performed by using a reward. However, instead of reinforcement learning, the learning unit 103 may perform supervised learning in which learning is performed on the basis of training data.

A demand control system 10 according to a modification A will be described with reference to the drawings. The demand control system 10 according to the first embodiment and the demand control system 10 according to the modification A have a common basic configuration. Differences between the first embodiment and the modification A will be mainly described below.

Figure 9:
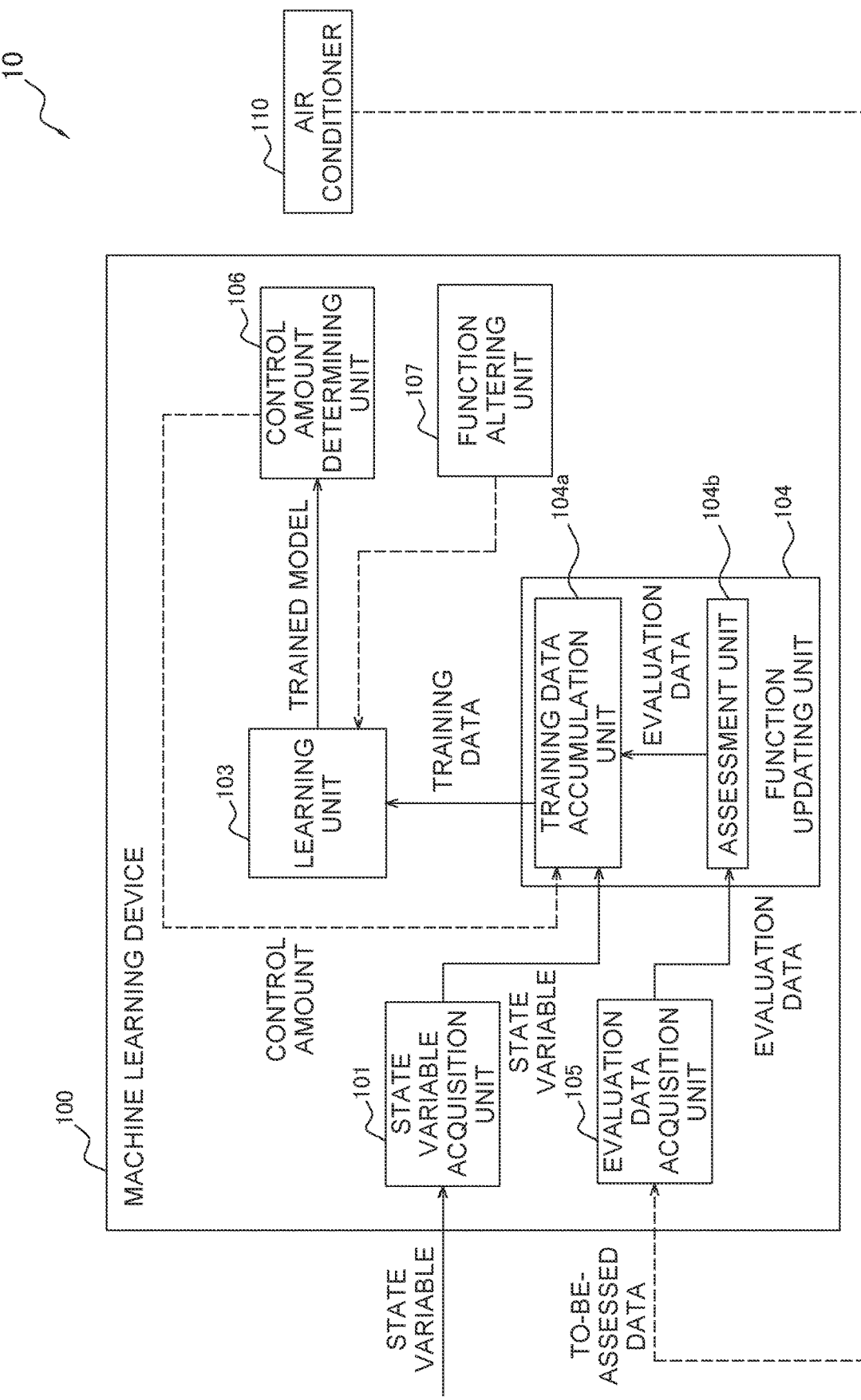
FIG. 9 is a block diagram of the machine learning device 100 during learning in accordance with a modification A.
Figure 10:
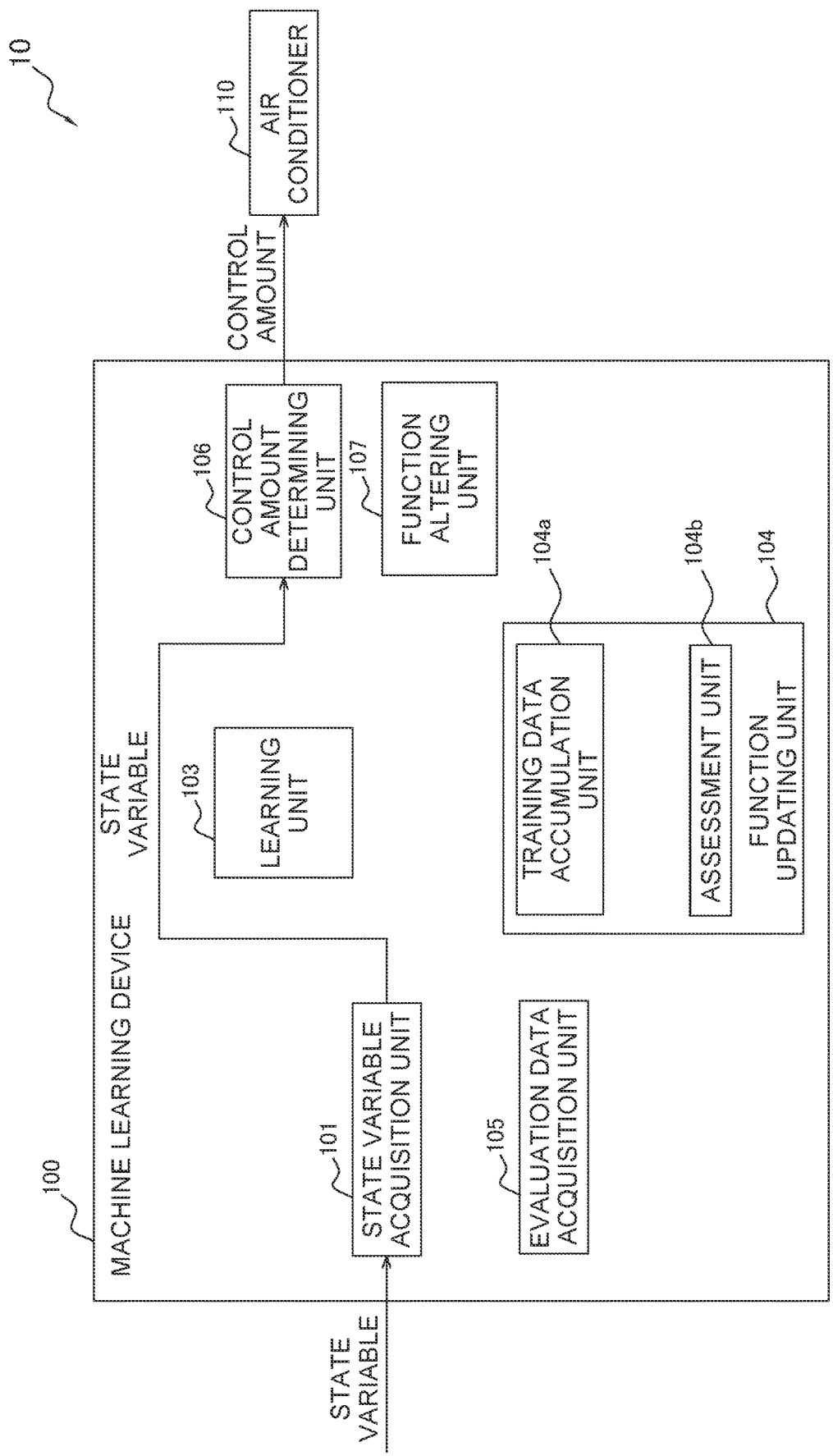
FIG. 10 is a block diagram of the machine learning device 100 after learning in accordance with the modification A.

FIG. 9 is a block diagram of a machine learning device 100 during learning in the modification A. FIG. 10 is a block diagram of the machine learning device 100 after learning in the modification A. The machine learning device 100 further includes a function altering unit 107.

The function updating unit 104 includes a training data accumulation unit 104a and an assessment unit 104b. By using the evaluation data acquired by the evaluation data acquisition unit 105, the assessment unit 104b outputs an assessment result of the evaluation data. In accordance with the assessment result obtained by the assessment unit 104b, the training data accumulation unit 104a accumulates training data based on the state variable acquired by the state variable acquisition unit 101 and the control amount (set temperature in a target space).

The learning unit 103 slightly alters a parameter of a discriminant function in accordance with an output of the function altering unit 107. The learning unit 103 alters the parameter of the discriminant function a plurality of times and outputs, for each discriminant function whose parameter has been altered, the control amount from the state variable. The discriminant function refers to a mapping from the state variable included in training data to the control amount. Specifically, the discriminant function is a function whose input variable is the state variable and whose output variable is the control amount. The function altering unit 107 outputs the parameter of the discriminant function. If it is determined that the evaluation data obtained as a result of control of the demand control system 10 on the basis of the control amount output by the learning unit 103 from the state variable is appropriate, the function updating unit 104 accumulates, as training data, the state variable and the control amount output by the learning unit 103 from the state variable.

The learning unit 103 performs learning on the basis of the training data accumulated in the training data accumulation unit 104a. The purpose of learning performed by the learning unit 103 is to adjust the parameter of the discriminant function by using the training data as learning data so that correct or appropriate evaluation data can be obtained from a new state variable. The learning unit 103 uses, as the learning data, pairs of the state variable acquired in advance by the state variable acquisition unit 101 and the control amount. The discriminant function whose parameter is sufficiently adjusted by the learning unit 103 corresponds to the trained model.

The control amount determining unit 106 determines the control amount (set temperature in the target space) from a new state variable on the basis of the trained model obtained as a result of learning performed by the learning unit 103. The control amount determined by the control amount determining unit 106 is used as new training data.

As described next, the learning unit 103 performs supervised learning based on online learning or batch learning.

In supervised learning based on online learning, the learning unit 103 generates a trained model in advance by using data (state variable) acquired in a test operation or the like performed before shipment or installation of the demand control system 10. At the time of the start of the initial operation of the demand control system 10, the control amount determining unit 106 determines the control amount (set temperature in the target space) on the basis of the trained model generated in advance by the learning unit 103. The learning unit 103 then updates the trained model by using data (state variable) newly acquired during operation of the demand control system 10. The control amount determining unit 106 determines the control amount on the basis of the trained model updated by the learning unit 103. As described above, in the online learning, the trained model is regularly updated, and the control amount determining unit 106 determines the control amount on the basis of the latest trained mode.

In supervised learning based on batch learning, the learning unit 103 generates a trained model in advance by using data (state variable) acquired in a test operation or the like performed before shipment or installation of the demand control system 10. At the time of the operation of the demand control system 10, the control amount determining unit 106 determines the control amount on the basis of the trained model generated in advance by the learning unit 103. This trained model is not updated after being generated in advance by the learning unit 103. That is, the control amount determining unit 106 determines the control amount by using the same trained model.

Note that a server connected to the demand control system 10 via a computer network such as the Internet may generate the trained model, or the trained model may be generated by using a cloud computing service.

(2) Modification B

In the second embodiment, the learning unit 203 performs reinforcement learning in which learning is performed by using a reward. However, instead of reinforcement learning, the learning unit 203 may perform supervised learning in which learning is performed on the basis of training data, as described in the modification A. In this case, the learning unit 203 may perform learning by using training data obtained from the state variable acquired by the state variable acquisition unit 201 and the control amount (the partial load characteristics of the air conditioner 210) acquired by the control amount acquisition unit 202.

(3) Modification C

In the third and fourth embodiments, the learning units 303, 413, and 423 perform reinforcement learning in which learning is performed by using a reward. However, instead of reinforcement learning, the learning units 303, 413, and 423 may perform supervised learning in which learning is performed on the basis of training data, as described in the modification A. In this case, for example, the learning unit 303 may perform learning by using training data obtained from the state variable acquired by the state variable acquisition unit 301 and the control amount (the heat capacity characteristics of the target space where the air conditioner 310 is installed) acquired by the control amount acquisition unit 302.

(4) Modification D

In the modifications A to C, in the case where the learning units 103, 203, 303, 413, and 423 perform supervised learning in which training data is used, the learning units 103, 203, 303, 413, and 423 may use part of the training data as learning data to adjust the parameter of the discriminant function and may use the rest of the training data as test data. The test data refers to data that is not used in learning and is used for evaluation of the performance of the trained model. By using the test data, the accuracy of the evaluation data obtained from a new state variable can be predicted in a form of an error probability for the test data. As techniques for splitting data acquired in advance into learning data and test data, hold-out, cross-validation, leave-one-out (jack-knife), bootstrapping, and the like are used.

(5) Modification E

Supervised learning that is a machine learning technique used by the learning units 103, 203, 303, 413, and 423 in the modifications A to D will be described. Supervised learning is a technique for generating an output corresponding to unseen input data by using training data. In supervised learning, learning data and a discriminant function are used. The learning data is a set of pairs of input data and training data corresponding to the input data. The input data is, for example, a feature vector in a feature space. The training data is, for example, parameters regarding discrimination, classification, and evaluation of the input data. The discriminant function represents a mapping from input data to an output corresponding to the input data. Supervised learning is a technique of adjusting a parameter of the discriminant function by using learning data given in advance such that a difference between an output of the discriminant function and training data decreases. Models or algorithms used in supervised learning include a regression analysis, a time-series analysis, a decision tree, a support vector machine, a neural network, ensemble learning, etc.

The regression analysis is, for example, a linear regression analysis, a multiple regression analysis, or a logistic regression analysis. The regression analysis is a technique for applying a model between input data (explanatory variable) and training data (objective variable) by using the least squares method or the like. The dimension of the explanatory variable is 1 in the linear regression analysis and 2 or higher in the multiple regression analysis. In the logistic regression analysis, a logistic function (sigmoid function) is used as the model.

The time-series analysis refers to, for example, an AR model (autoregressive model), an MA model (moving average model), an ARMA model (autoregressive moving average model), an ARIMA model (autoregressive integrated moving average model), an SARIMA model (seasonal autoregressive integrated moving average model), or a VAR model (vector autoregressive model). The AR, MA, ARMA, and VAR models represent a stationary process. The ARIMA and SARIMA models represent a non-stationary process. The AR model is a model in which a value regularly changes as time passes. The MA model is a model in which a fluctuation in a certain period is constant. For example, in the MA model, a value at a certain time point is determined by a moving average before the time point. The ARMA model is a combined model of the AR model and the MA model. The ARIMA model is a model in which the ARMA model is applied to a difference between preceding and following values in consideration of a middle-term or long-term trend (increasing or decreasing trend). The SARIMA model is a model in which the ARIMA model is applied in consideration of a middle-term or long-term seasonal fluctuation. The VAR model is a model in which the AR model is expanded to support multiple variables.

The decision tree is a model for generating complex discrimination boundaries by combining a plurality of discriminators. Details of the decision tree will be described later.

The support vector machine is an algorithm for generating a two-class linear discriminant function. Details of the support vector machine will be described later.

The neural network is obtained by modeling a network formed by connecting neurons of the human cranial nervous system by synapses. The neural network means a multi-layer perceptron that uses error backpropagation in a narrow sense. Examples of the typical neural network include a convolutional neural network (CNN) and a recurrent neural network (RNN). The CNN is a type of a non-fully-connected (coarsely-connected) forward-propagation neural network. The RNN is a type of the neural network having a directed cycle. The CNN and the RNN are used in audio/image/moving image recognition and natural language processing.

The ensemble learning is a technique for improving the discrimination performance by combining a plurality of models. The technique used in the ensemble learning is, for example, bagging, boosting, or a random forest. Bagging is a technique for training a plurality of models by using bootstrap sampling of learning data and determining evaluation for new input data by a majority vote of the plurality of models. Boosting is a technique for weighting learning data in accordance with a bagging-based teaming result so that incorrectly discriminated learning data is learned in a more concentrated manner than correctly discriminated learning data. The random forest is a technique for generating a decision tree group (random forest) constituted by a plurality of decision trees having a low correlation in the case where the decision tree is used as the model. Details of the random forest will be described later.

The neural network, the support vector machine, the decision tree, and the random forest, which will be described next, are used as preferable models or algorithms of supervised learning used by the learning units 103, 203, 303, 413, and 423.

(5-1) Neural Network

Figure 11:
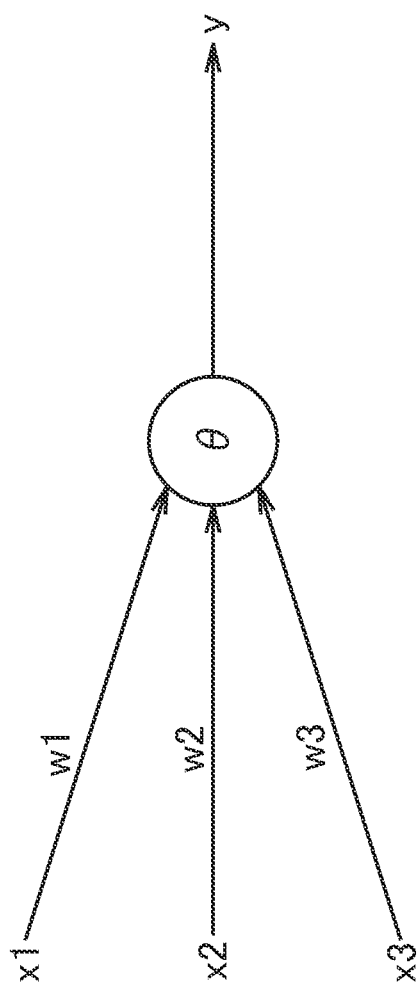
FIG. 11 is a schematic diagram of a model of a neuron in a neural network.
Figure 12:
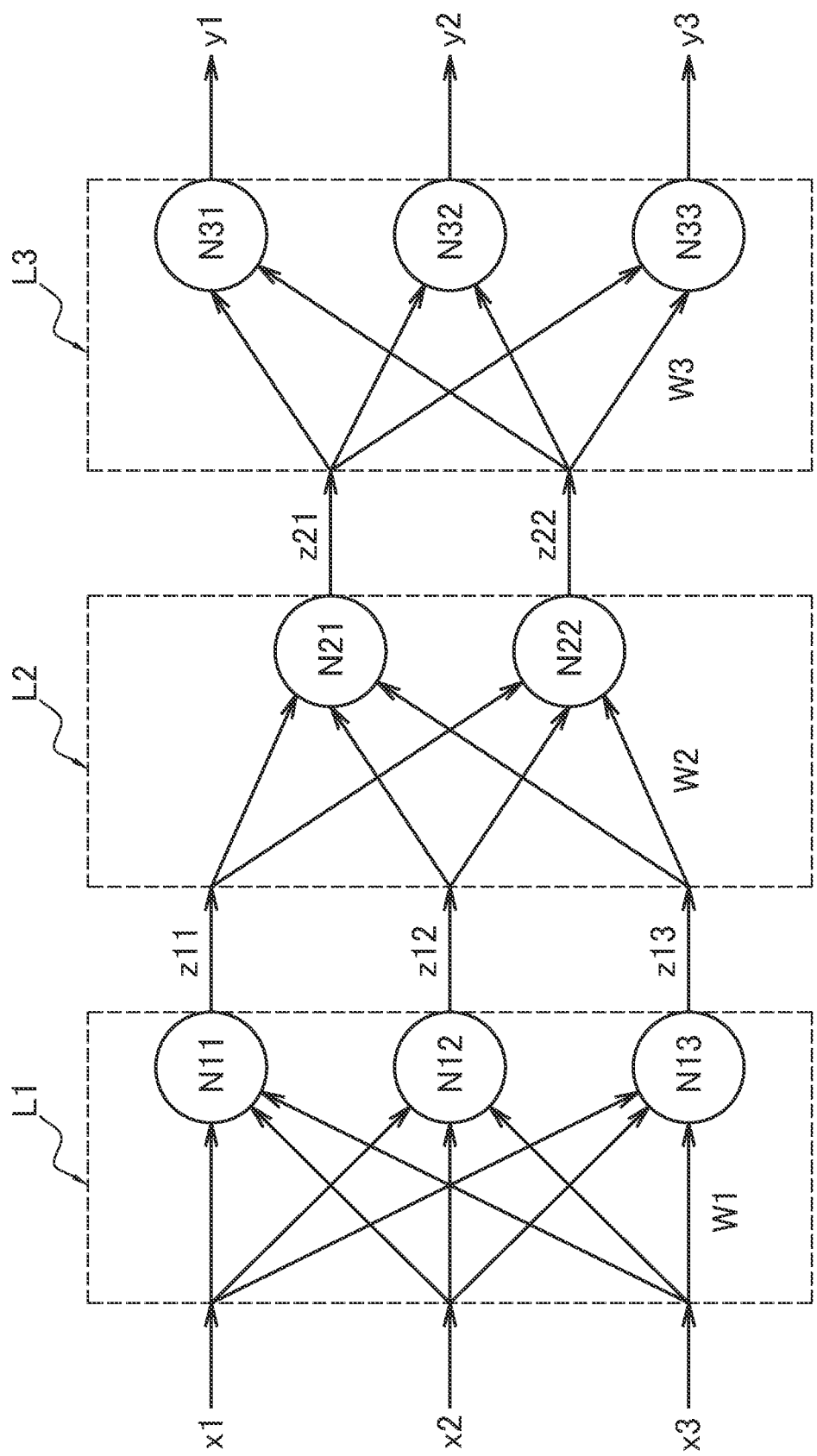
FIG. 12 is a schematic diagram of a three-layer neural network constituted by a combination of the neurons illustrated in FIG. 11.

FIG. 11 is a schematic diagram of a model of a neuron in a neural network. FIG. 12 is a schematic diagram of a three-layer neural network constituted by a combination of the neurons illustrated in FIG. 11. As illustrated in FIG. 11, a neuron outputs an output y for a plurality of inputs x (inputs x1, x2, and x3 in FIG. 11). The inputs x rputs x1, x2, and x3 in FIG. 11) are multiplied by corresponding weights w (weights w1, w2, and w3 in FIG. 11), respectively. The neuron outputs the output y by using Expression (1) below.

$$y = \varphi(\Sigma_{i=1}^{n} x_i w_i - \theta) \tag{1}$$

In Expression (1), all of the input x, the output y, and the weight w denote vectors, θ denotes a bias, and φ denotes an activation function. The activation function is a non-linear function and is, for example, a step function (formal neuron), a simple perceptron, a sigmoid function, or a ReLU (ramp function).

In the three-layer neural network illustrated in FIG. 12, a plurality of input vectors x (input vectors x1, x2, and x3 in FIG. 12) are input from an input side (left side in FIG. 12), and a plurality of output vectors v (output vectors y1, y2, and y3 in FIG. 12) are output from an output side (right side in FIG. 12). This neural network is constituted by three layers L1, L2, and L3.

In the first layer L1, the input vectors x1, x2, and x3 are multiplied by corresponding weights and are input to each of three neurons N11, N12, and N13. In FIG. 12, these weights are collectively denoted by W1. The neurons N11, N12, and N13 output feature vectors z11, z12, and z13, respectively, In the second layer L2, the feature vectors z11, z12, and z13 are multiplied by corresponding weights and are input to each of two neurons N21 and N22. In FIG. 12, these weights are collectively denoted by W2. The neurons N21 and N22 output feature vectors z21 and z22, respectively.

In the third layer L3, the feature vectors z21 and z22 are multiplied by corresponding weights and are input to each of three neurons N31, N32, and N33. In FIG. 12, these weights are collectively denoted by W3. The neurons N31, N32, and N33 output the output vectors y1, y2, and y3, respectively.

There are a learning mode and a prediction mode in terms of operation of the neural network. In the learning mode, the neural network learns the weights W1, W2, and W3 by using a learning dataset. In the prediction mode, the neural network performs prediction such as discrimination by using the parameters of the learned weights W1, W2, and W3.

The weights W1, W2, and W3 can be learned through error backpropagation (backpropagation), for example. In this case, information regarding the error is transferred from the output side toward the input side, that is, from the right side toward the left side in FIG. 12. The error backpropagation is a technique for performing learning by adjusting the weights W1, W2, and W3 such that a difference between the output y obtained when the input x is input to each neuron and the true output y (training data) decreases.

The neural network can be configured to have more than three layers. A machine learning technique using a neural network having four or more layers is known as deep learning.

(5-2) Support Vector Machine

Figure 13:
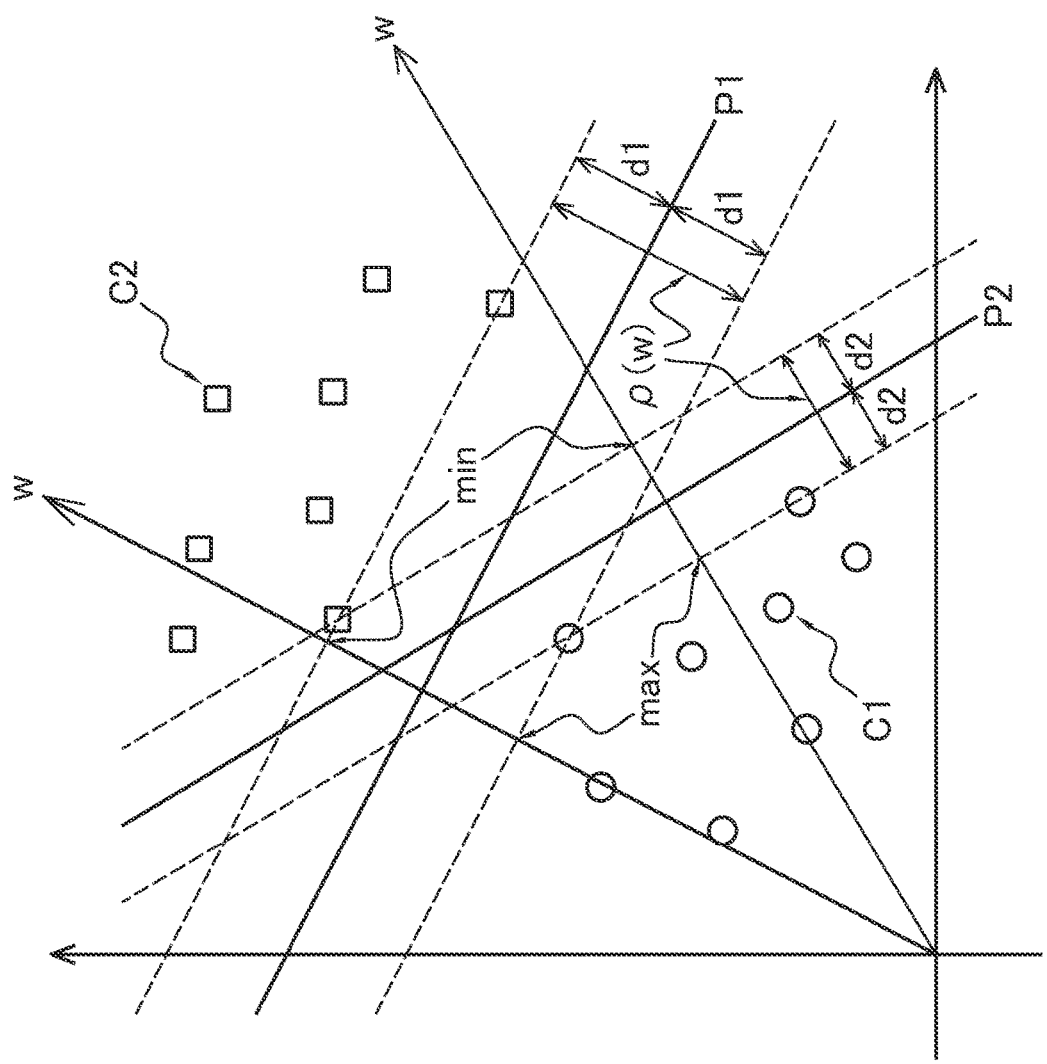
FIG. 13 is a diagram for describing a support vector machine, and illustrates a feature space in which pieces of learning data of two classes are linearly separable.

The support vector machine (SVM) is an algorithm that determines a two-class linear discriminant function that implements the maximum margin. FIG. 13 is a diagram for describing the SVM. The two-class linear discriminant function represents discrimination hyperplanes P1 and P2 which are hyperplanes for linearly separating pieces of learning data of two classes C1 and C2 from each other in a feature space illustrated in FIG. 13. In FIG. 13, pieces of learning data of the class C1 are represented by circles, and pieces of learning data of the class C2 are represented by squares. A margin of a discrimination hyperplane refers to a distance between learning data closest to the discrimination hyperplane and the discrimination hyperplane. FIG. 13 illustrates a margin d1 for the discrimination hyperplane P1 and a margin d2 for the discrimination hyperplane P2. In the SVM, the optimum discrimination hyperplane P1 which is a discrimination hyperplane with the maximum margin is determined. A minimum value d1 of the distance between the learning data of one class C1 and the optimum discrimination hyperplane P1 is equal to a minimum value d1 of the distance between the learning data of the other class C2 and the optimum discrimination hyperplane P1.

In FIG. 13, a learning dataset $D_L$ used in supervised learning of a two-class problem is represented by Expression (2) below.

$$D_L = \{(t_i, x_i)\} (i=1, \ldots, N) \quad (2)$$

The learning dataset $D_L$ is a set of pairs of learning data (feature vector) $x_i$ and training data $t_i = \{-1, +1\}$. The number of elements of time learning dataset $D_L$ is N. The training data $t_i$ indicates which of the classes C1 and C2 the learning data $x_i$ belongs to. The class C1 is a class denoted by $t_i = -1$, and the class C2 is a class denoted by $t_i = +1$.

A normalized linear discriminant function that holds for all the pieces of learning data $x_i$ in FIG. 13 is represented by two Expressions (3-1) and (3-2) below. w denotes a coefficient vector and b denotes a bias.

$$\text{If } t_i = +1, w^T x_i + b \geq +1 \quad (3\text{-}1)$$

$$\text{If } t_i = -1, w^T x_i + b \leq -1 \quad (3\text{-}2)$$

These two Expressions are represented by one Expression (4) below.

$$t_i(w^T x_i + b) \geq 1 \quad (4)$$

In the case where each of the discrimination hyperplanes P1 and P2 is represented by Expression (5) below, the margin d thereof is represented by Expression (6).

$$w^T x + b = 0 \quad (5)$$

$$d = \frac{1}{2}\rho(w) = \frac{1}{2}\left(\min_{x_i \in C_2} \frac{w^T x_i}{\|w\|} - \max_{x_i \in C_1} \frac{w^T x_i}{\|w\|}\right) \quad (6)$$

In Expression (6), ρ(w) denotes the minimum value of a difference between lengths obtained by projecting the learning data $x_i$ of the class C1 and the learning data $x_i$ of the class C2 onto a normal vector w of each of the discrimination hyperplanes P1 and P2. The terms "min" and "max" in Expression (6) indicate points denoted by reference signs "min" and "max" in FIG. 13, respectively. In FIG. 13, the optimum discrimination hyperplane is the discrimination hyperplane P1 having the maximum margin d.

Figure 14:
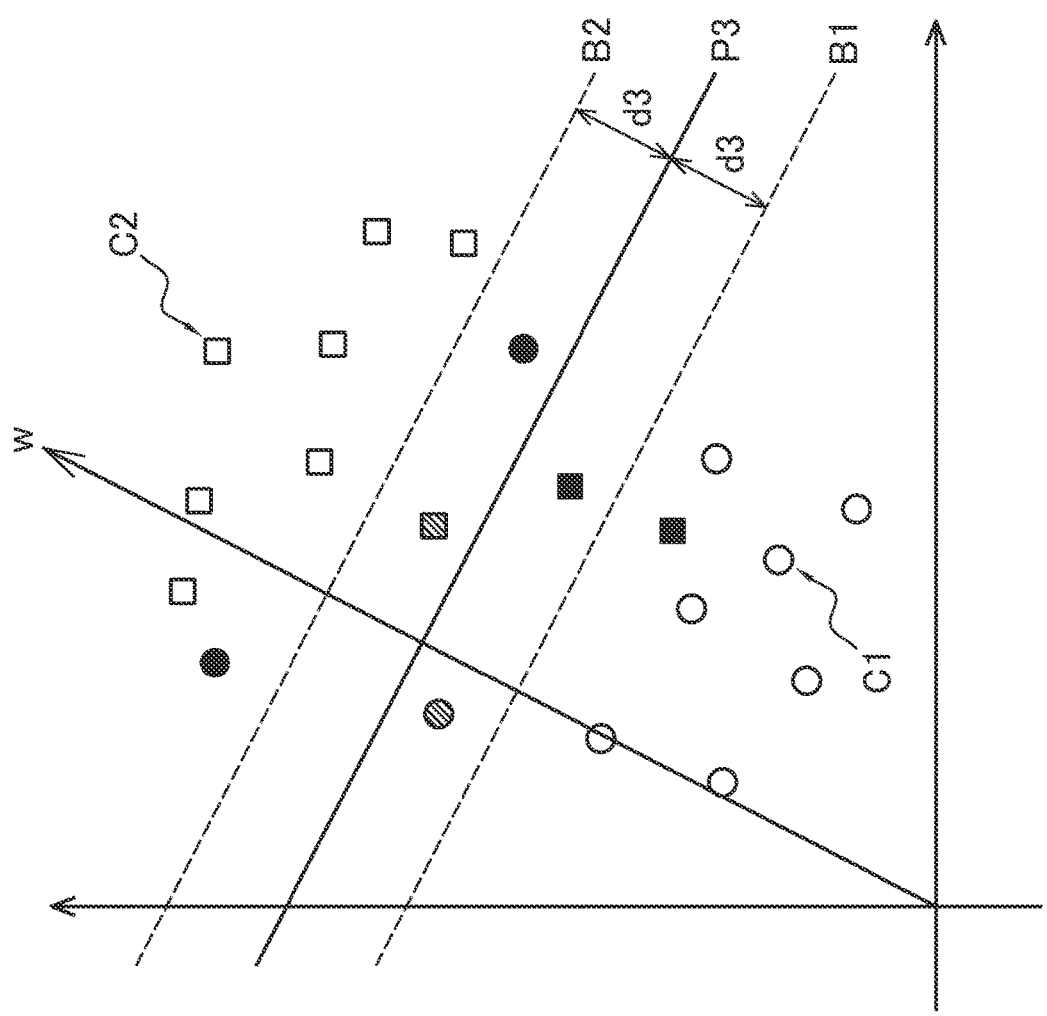
FIG. 14 illustrates a feature space in which pieces of learning data of two classes are linearly inseparable.

FIG. 13 illustrates the feature space in which the pieces of learning data of two classes are linearly separable. FIG. 14 illustrates a feature space which is similar to that of FIG. 13 and in which pieces of learning data of two classes are linearly inseparable. In the case where pieces of learning data of two classes are linearly inseparable. Expression (7) below, which is expanded by introducing a slack variable $\xi_i$ to Expression (4), can be used.

$$t_i(w^T x_i + b) - 1 + \xi_i \geq 0 \quad (7)$$

The slack variable $\xi_i$ is used only at the time of learning and takes a value of 0 or greater. FIG. 14 illustrates a discrimination hyperplane P3, margin boundaries B1 and B2, and a margin d3. Expression for the discrimination hyperplane P3 is the same as Expression (5). The margin boundaries B1 and B2 arc hyperplanes whose distance from the discrimination hyperplane P3 is the margin d3.

In the case where the slack variable $\xi_i$ is equal to 0, Expression (7) is equivalent to Expression (4). At this time, as indicated by blank circles or squares in FIG. 14, the learning data $x_i$ that satisfies Expression (7) is correctly discriminated within the margin d3. At this time, the distance between the learning data $x_i$ and the discrimination hyperplane P3 is greater than or equal to the margin d3.

In the case where the slack variable $\xi_i$ is greater than 0 and less than or equal to 1, as indicated by a hatched circle or square in FIG. 14, the learning data $x_i$ that satisfies Expression (7) is beyond the margin boundaries B1 and B2 but is not beyond the discrimination hyperplane P3 and thus is correctly discriminated. At this time, the distance between the learning data $x_i$ and the discrimination hyperplane P3 is less than the margin d3.

In the case where the slack variable $\xi_i$ is greater than 1, as indicated by black circles or squares in FIG. 14, the learning data $x_i$ that satisfies Expression (7) is beyond the discrimination hyperplane P3 and thus is incorrectly recognized.

The use of Expression (7) in which the slack variable $\xi_i$ is introduced enables the learning data $x_i$ to be discriminated in this manner also in the case where pieces of learning data of two classes are linearly inseparable.

From the description above, the sum of the slack variable $\xi_i$ for all the pieces of learning data $x_i$ indicates the upper limit of the number of pieces of learning data $x_i$ incorrectly recognized. Here, an evaluation function $L_p$ is defined by Expression (8) below.

$$L_p(w,\xi)=\tfrac{1}{2}w^T w+C\Sigma_{i=1}^{N}\xi_i \qquad (8)$$

The learning units 103, 203, 303, 413, and 423 find a solution (w, $\xi$) that minimizes an output value of the evaluation function $L_p$. In Expression (8), a parameter C of the second term denotes a strength of a penalty for incorrect recognition. As the parameter C increases, a solution for prioritizing a reduction in the number of incorrect recognition (second term) over a norm (first term) of w is determined.

(5-3) Decision Tree

Figure 15:
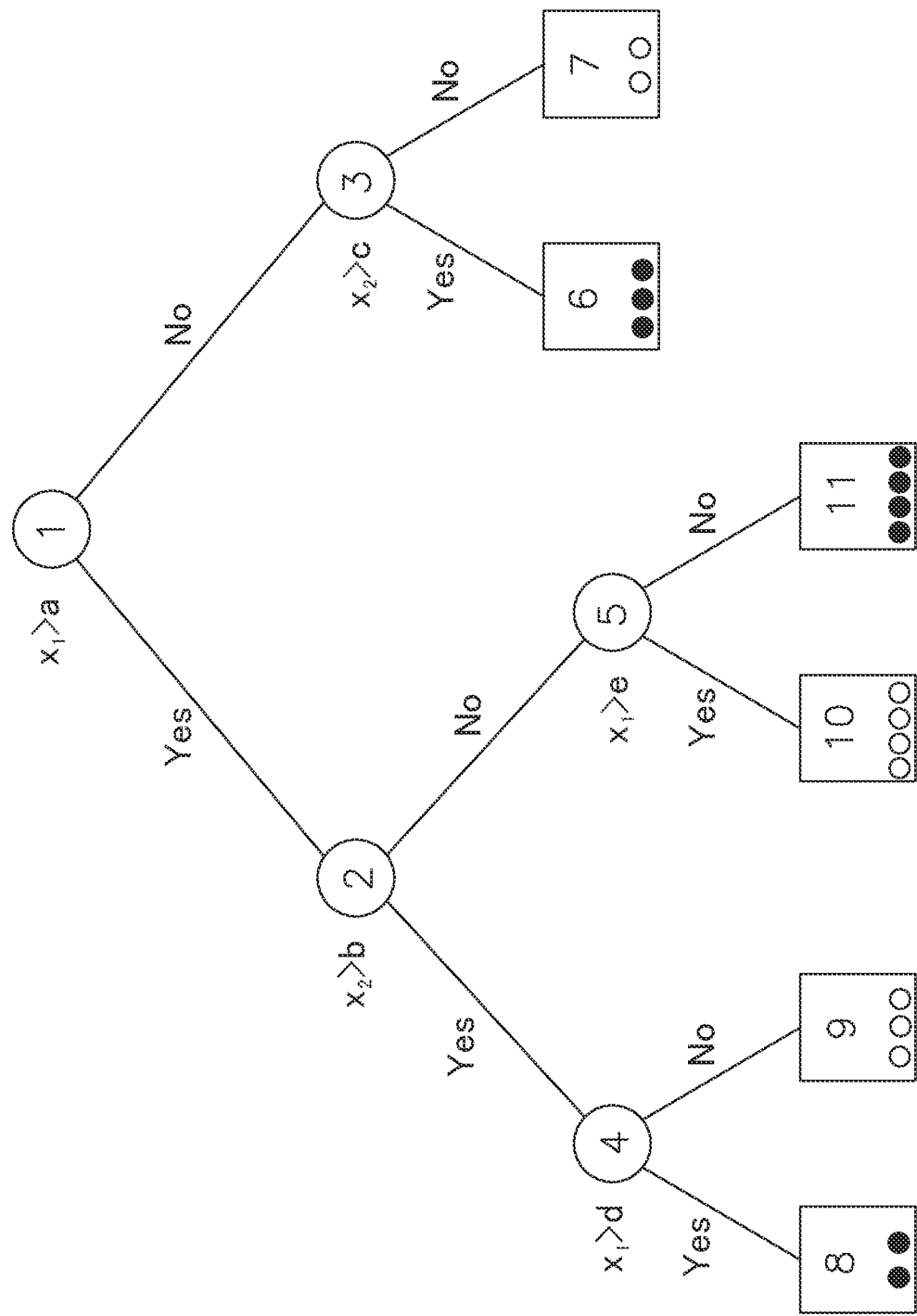
FIG. 15 is an example of a decision tree created in accordance with a divide and conquer algorithm.
Figure 16:
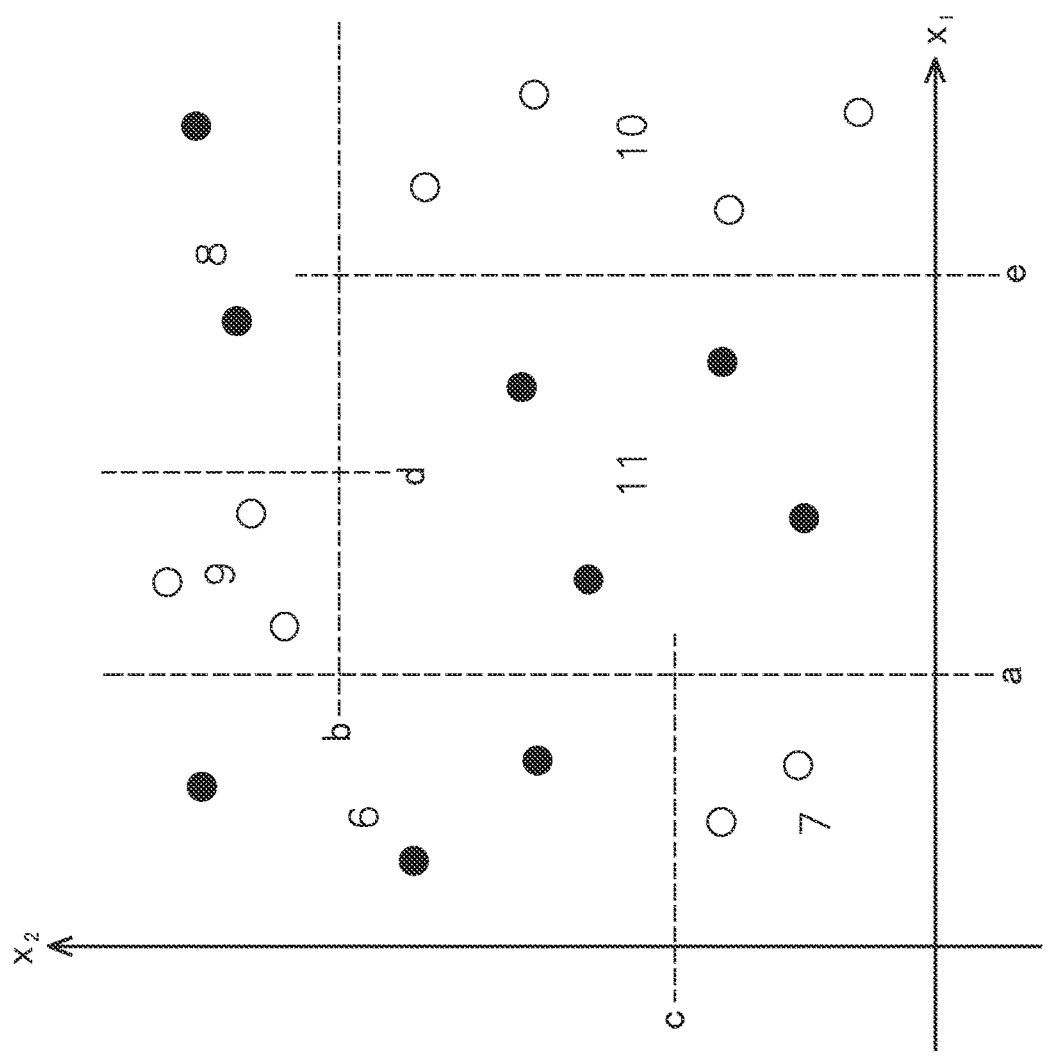
FIG. 16 illustrates a feature space divided in accordance with the decision tree of FIG. 15.

The decision tree is a model for obtaining a complex discrimination boundary (such as a non-linear discriminant function) by combining a plurality of discriminators. A discriminator is, for example, a rule regarding a magnitude relationship between a value on a certain feature axis and a threshold. Examples of a method for creating a decision tree from learning data include, for example, a divide and conquer algorithm for repeatedly finding a rule (discriminator) for dividing a feature space into two. FIG. 15 is an example of a decision tree created in accordance with the divide and conquer algorithm. FIG. 16 illustrates a feature space divided in accordance with the decision tree of FIG. 15. In FIG. 16, each piece of learning data is denoted by a white or black dot. Each piece of learning data is classified into a white dot class or a black dot class in accordance with the decision tree illustrated in FIG. 15. FIG. 15 illustrates nodes numbered from 1 to 11 and links, labeled Yes or No, linking the nodes to each other. In FIG. 15, a quadrangle denotes a terminal node (leaf node) and a circle denotes a non-terminal node (root node or internal node). The terminal nodes are nodes numbered from 6 to 11, and the non-terminal nodes are nodes numbered from 1 to 5. In each terminal node, white dots or black dots representing pieces of learning data are illustrated. Non-terminal nodes are equipped with respective discriminators. The discriminators are rules for determining magnitude relationships between values on feature axes x1 and x2 and thresholds a to e. The labels assigned to the respective links indicate the determination results of the corresponding discriminators. In FIG. 16, the discriminators are represented by dotted lines, and a region divided by each of the discriminators is denoted by the numeral of the corresponding node.

In the process of creating an appropriate decision tree by using the divide and conquer algorithm, it is necessary to consider three points (a) to (c) below.

(a) Selection of a feature axis and a threshold for configuring a discriminator.

(b) Determination of a terminal node. For example, the number of classes to which the learning data included in one terminal node belongs. Alternatively, selection of how far decision tree pruning (obtaining subtrees having the same root node) is to be performed.

(c) Assignment of a class to a terminal node by a majority vote.

In a decision-tree-based learning method, for example, CART, ID3, and C4.5 are used. CART is a technique for generating a binary tree as a decision tree by dividing, for each feature axis, a feature space into two at each of nodes other than terminal nodes as illustrated in FIGS. 15 and 16.

In learning using a decision tree, to improve the learning data discrimination performance, it is important to divide the feature space at an appropriate division candidate point at a non-terminal node. An evaluation function called a diversity index may be used as a parameter for evaluating the division candidate point of the feature space. As a function I(t) representing the diversity index of a node t, for example, parameters represented by Expressions (9-1) to (9-3) below are used. K denotes the number of classes.

(a) Error rate at node t $$I(t) = 1 - \max_i P(C_i \mid t) \qquad (9\text{-}1)$$

(b) Cross-entropy (deviance)

$$I(t)=-\Sigma_{i=1}^{K}P(C_i|t)\ln P(C_i|t) \qquad (9\text{-}2)$$

(c) Gini coefficient $$I(t)=\Sigma_{i=1}^{K}\Sigma_{j\neq i}P(C_i|t)P(C_j|t)=\Sigma_{i=1}^{K}P(C_i|t)(1-P(C_i|t)) \qquad (9\text{-}3)$$

In Expressions above, a probability $P(C_i|t)$ is a posterior probability of a class $C_i$ at the node t, that is, a probability of data of the class $C_i$ being selected at the node t. In the second part of Expression (9-3), a probability $P(C_j|t)$ is a probability of data of the class $C_i$ being incorrectly discriminated to be in a j-th ($\neq$i-th) class. Thus, the second part represents an error rate at the node t. The third part of Expression (9-3) represents a sum of variances of the probability $P(C_i|t)$ for all the classes.

In the case of dividing a node by using the diversity index as the evaluation function, for example, a technique of pruning the decision tree up to an allowable range that is determined by an error rate at the node and by the complexity of the decision tree is used.

(5-4) Random Forest

The random forest is a type of ensemble learning and a technique for enhancing the discrimination performance by combining a plurality of decision trees. In learning using the random forest, a group (random forest) of a plurality of decision trees having a low correlation is generated. The following algorithm is used in generation of the random forest and discrimination using the random forest.

(A) The following is repeated while m=1 to M.
  (a) From N pieces of d-dimensional learning data, in bootstrap samples $Z_m$ are generated.
  (b) By using $Z_m$ as learning data, each node t is divided in the following procedure to generate m decision trees.
    (i) From d features, d' features are randomly selected. (d'<d)
    (ii) From among the d' selected features, a feature that implements optimum division of the learning data and a division point (threshold) are determined.
    (iii) The node t is divided into two at the determined division point.

(B) A random forest constituted by the m decision trees is output.

(C) A discrimination result of each decision tree of the random forest for input data is obtained. A discrimination result of the random forest is determined by a majority vote of the discrimination results of the respective decision trees.

In learning using the random forest, a correlation between decision trees can be made low by randomly selecting a predetermined number of features for use in discrimination at individual non-terminal nodes of the decision trees.

(6) Modification F

Reinforcement learning that is a machine learning technique used by the learning units 103, 203, 303, 413, and 423 in the first to fourth embodiments will be described.

Reinforcement learning is a technique for learning a policy that maximizes a reward which is a result of a series of actions. Models or algorithms used in reinforcement learning include Q-learning or the like. Q-learning is a technique for learning a Q-value that represents a value of selecting an action a in a state s. In Q-learning, an action a with the highest Q-value is selected as an optimum action. To determine a high Q-value, an entity (agent) of the action a is rewarded for the action a selected in the state s. In Q-learning, the Q-value is updated by using Expression (10) below every time the agent takes an action.

$$Q(s_t, a_t) \leftarrow Q(s_t, a_t) + \alpha\left(r_{t+1} + \gamma \max_\alpha Q(s_{t+1}, a_t) - Q(s_t, a_t)\right) \quad (10)$$

In Expression (10), $Q(s_t, a_t)$ is the Q-value that represents a value of the agent in a state $s_t$ selecting an action $a_t$. $Q(s_t, a_t)$ is a function (action-value function) having a state s and an action a as parameters. $s_t$ denotes a state of the agent at a time t. $a_t$ denotes an action of the agent at the time t. $\alpha$ denotes a learning coefficient. $\alpha$ is set such that the Q-value converges to an optimum value in accordance with Expression (10), $r_{t+1}$ denotes a reward obtained when the agent transitions to a state $s_{t+1}$. $\gamma$ denotes a discount factor. $\gamma$ is a constant that is greater than or equal to 0 and less than or equal to 1. The term including max is a product obtained by multiplying by $\gamma$ the Q-value in the case of selecting the action a with the highest Q-value in the state $s_{t+1}$. The Q-value determined by using the action-value function is an expected value of the reward to be obtained by the agent.

(7) Modification G

In the first embodiment and the modification A, the state variable may further include at least one of an indoor condition and an outdoor condition. The indoor condition includes at least one of a temperature in the target space, a humidity in the target space, an amount of change in temperature in the target space, an amount of change in humidity in the target space, the number of people in the target space, and the power consumption of a device installed in the target space. The device installed in the target space is the air conditioner 110, a light, a PC, etc. The outdoor condition includes at least one of a temperature, a humidity, and an amount of solar radiation in a space where an outdoor unit of the air conditioner 110 is installed.

The above-described indoor condition and outdoor condition correspond to disturbances that influence the demand target value. Thus, in the case where the predetermined demand target value is set, the machine learning device 100 according to the modification G can automatically determine the set temperature in the target space for implementing the demand target value by taking into account the influence of the disturbances.

(8) Modification H

In the third and fourth embodiments and the modification C, the state variable may further include at least one of an indoor condition and an outdoor condition. The indoor condition includes at least one of a temperature in the target space, a humidity in the target space, an amount of change in temperature in the target space, an amount of change in humidity in the target space, the number of people in the target space, and the power consumption of a device installed in the target space. The device installed in the target space is the air conditioner 310, the air conditioner 410, a light, a PC, etc. The outdoor condition includes at least one of a temperature, a humidity, and an amount of solar radiation in a space where an outdoor unit of the air conditioner 310 or 410 is installed.

The above-described indoor condition and outdoor condition correspond to disturbances that influence the heat capacity characteristics of the target space where the air conditioner 310 or 410 is installed. Thus, the machine learning device 300 or 400 according to the modification H can acquire the predicted value of the heat capacity characteristics of the target space with a high accuracy by taking into account the influence of the disturbances.

(9) Modification I

In the embodiments and modifications described above, the machine learning devices 100, 200, 300, and 400 use supervised learning or reinforcement learning. However, the machine learning devices 100, 200, 300, and 400 may use a combined technique of supervised learning and reinforcement learning.

(10) Modification J

In the embodiments and modifications described above, the learning units 103, 203, 303, 413, and 423 may use various machine learning techniques. Machine learning techniques that may be used by the learning units 103, 203, 303, 413, and 423 include unsupervised learning, semi-supervised learning, transductive learning, multi-task learning, transfer learning, etc. in addition to supervised learning and reinforcement learning already described. The learning units 103, 203, 303, 413, and 423 may use these techniques in combination.

Unsupervised learning is a technique of grouping (clustering) input data on the basis of a predetermined statistical property without using training data. Models or algorithms used in unsupervised learning include k-means clustering, the Ward's method, the principal component analysis, etc. The k-means clustering is a technique in which a process of randomly assigning a cluster to each piece of input data, calculating the center of each cluster, and re-assigning each piece of input data to a cluster having the nearest center is repeated. The Ward's method is a technique in which a process of assigning each piece of input data to a cluster is repeated to minimize a distance from each piece of input data of a cluster to the mass center of the cluster. The principal component analysis is a technique of a multivariate analysis that generates variables called principal components having the lowest correlation from among a plurality of correlated variables.

The semi-supervised learning is a technique of performing learning by using both input data not assigned corresponding training data (unlabeled data) and input data (labeled data) assigned corresponding training data.

The transductive learning is a technique of generating an output corresponding to unlabeled data for use in learning and not generating an output corresponding to unseen input data in semi-supervised learning.

The multi-task learning is a technique of sharing information among a plurality of related tasks and causing these tasks to simultaneously perform learning to obtain a factor that is common to the tasks and increase the prediction accuracy.

The transfer learning is a technique of applying a model trained in advance in a certain domain to another domain to increase the prediction accuracy.

In Closing

While the embodiments of the present disclosure have been described above, it should be understood that various modifications can be made on the configurations and details without departing from the gist and the scope of the present disclosure that are described in the claims.

The machine learning device can determine a set temperature for implementing a predetermined demand target value.

The invention claimed is:

1. A machine learning device configured to learn a set temperature, in a target space, in order to achieve a demand target value that is an upper-limit value of a power consumption of an air conditioner, installed in the target space, in a predetermined period, the machine learning device comprising:
   a learning unit;
   a first acquisition unit configured to acquire a first variable including at least one of
      the power consumption of the air conditioner and
      an indoor state value correlated with a state in the target space;
   a second acquisition unit configured to acquire evaluation data useable to evaluate a control result of the air conditioner;
   an updating unit configured to update, by calculating a reward using the evaluation data, a learning state of the learning unit; and
   a determining unit,
   the learning unit being configured to learn the first variable and the set temperature in association with each other by using the reward calculated by the updating unit and output a trained model,
   the evaluation data including the power consumption of the air conditioner,
   the updating unit being configured to calculate the reward based on the evaluation data, a higher reward being calculated as a difference between the demand target value and the power consumption of the air conditioner included in the evaluation data decreases,
   the second acquisition unit being configured to input at least one of a power value of the air conditioner, a current value of the air conditioner, and a number of revolutions of a compressor, to a predetermined evaluation function, and acquire an output value of the evaluation function as the evaluation data, and
   the determining unit being configured to determine the set temperature from the first variable acquired by the first acquisition unit, on the basis of the trained model obtained as a result of learning performed by the learning unit.

2. The machine learning device according to claim 1, further comprising:
   an altering unit configured to adjust a parameter of a discriminant function having
      an input variable that is the first variable and
      an output variable is the set temperature,
   the learning unit being configured to
      alter the parameter of the discriminant function in accordance with an output of the altering unit a plurality of times and
      output, for each discriminant with altered parameter, the set temperature from the first variable,
   the updating unit including an accumulation unit and an assessment unit,
   the assessment unit being configured to output an assessment result by using the evaluation data,
   the accumulation unit being configured to accumulate, in accordance with the assessment result, training data based on the first variable and the set temperature output by the learning unit from the first variable, and
   the learning unit being configured to perform learning based on the training data accumulated in the accumulation unit.

3. The machine learning device according to claim 1, wherein
   the indoor state value is at least one of a temperature, a humidity, an amount of change in temperature, and an amount of change in humidity in the target space.

4. The machine learning device according to claim 1, wherein
   the first variable further includes at least one of an indoor condition and an outdoor condition,
   the indoor condition includes at least one of
      a power consumption of a device installed in the target space and
      a number of people in the target space, and
   the outdoor condition includes at least one of a temperature, a humidity, and an amount of solar radiation in a space where an outdoor unit of the air conditioner is installed.

5. A demand control system including the machine learning device according to claim 1, the demand control system further comprising:
   an air conditioner.

6. An air-conditioner control system configured to determine a control parameter, useable in control of an air conditioner installed in a target space, in order to achieve a demand target value that is an upper-limit value of a power consumption of the air conditioner in a predetermined period, the air-conditioner control system comprising:
   a machine learning device configured to learn
      heat capacity characteristics of the target space where the air conditioner is installed and
      partial load characteristics of the air conditioner installed in the target space;
   an output unit configured to output candidates useable as the control parameter; and
   a determining unit configured to determine the control parameter,
   the machine learning device including
      a first acquisition unit configured to acquire a first variable including at least one of
         a first parameter correlated with a capacity of the air conditioner and
         a second parameter correlated with a state in the target space,
      a second acquisition unit configured to acquire a second variable including the heat capacity characteristics of the target space,
      a first learning unit configured to learn the first variable and the second variable in association with each other, a first inference unit configured to infer a first predicted value from the first variable based on a learning result of the first learning unit, the first predicted value being a predicted value of the heat capacity characteristics of the target space, a third acquisition unit configured to acquire a third variable including the first predicted value, a fourth acquisition unit configured to acquire a fourth variable including the partial load characteristics of the air conditioner, a second learning unit configured to learn the third variable and the fourth variable in association with each other, and a second inference unit configured to infer a second predicted value from the third variable based on the candidates output by the output unit and a learning result of the second learning unit, the second predicted value being a predicted value of the partial load characteristics of the air conditioner, and the determining unit being configured to determine the control parameter such that the second predicted value satisfies a predetermined condition related to the demand target value.

7. The air-conditioner control system according to claim 6, wherein the second parameter is at least one of a temperature, a humidity, an amount of change in temperature, and an amount of change in humidity in the target space, and the control parameter includes a set temperature, in the target space, in order to achieve the demand target value.

8. The air-conditioner control system according to claim 6, wherein the determining unit is configured to determine the control parameter such that a difference between a target value of the partial load characteristics of the air conditioner and the second predicted value inferred by the second inference unit decreases, and the second learning unit is configured to perform learning by using the control parameter determined by the determining unit.

\* \* \* \* \*